US006978148B2

(12) United States Patent
Adachi et al.

(10) Patent No.: US 6,978,148 B2
(45) Date of Patent: Dec. 20, 2005

(54) COMMUNICATION SYSTEM, TERMINAL, COMMUNICATION METHOD, AND RECORDING MEDIUM RECORDING COMMUNICATION METHOD PROGRAM FOR SELECTING TERMINAL OF COMMUNICATION PARTY

(75) Inventors: Makoto Adachi, Yamatokoriyama (JP); Tadami Tanabe, Kashiba (JP); Hiroyoshi Toda, Yamatokoriyama (JP)

(73) Assignee: Sharp Kabushiki Kaisha, Osaka (JP)

(*) Notice: Subject to any disclaimer, the term of this patent is extended or adjusted under 35 U.S.C. 154(b) by 450 days.

(21) Appl. No.: 10/191,501

(22) Filed: Jul. 10, 2002

(65) Prior Publication Data

US 2003/0013473 A1  Jan. 16, 2003

(30) Foreign Application Priority Data

Jul. 10, 2001  (JP)  ............................ 2001-209701

(51) Int. Cl.[7] .............................................. H04B 7/00
(52) U.S. Cl. .................. 455/517; 455/458; 455/432.3; 455/459
(58) Field of Search .............................. 455/517, 41.2, 455/458, 466, 556, 515, 522, 411, 519, 459, 455/432

(56) References Cited

U.S. PATENT DOCUMENTS

| 6,175,741 | B1 * | 1/2001 | Alperovich | 455/458 |
| 6,442,263 | B1 * | 8/2002 | Beaton et al. | 379/142.04 |
| 6,532,368 | B1 * | 3/2003 | Hild et al. | 455/515 |
| 2002/0065065 | A1 * | 5/2002 | Lunsford et al. | 455/411 |
| 2002/0123325 | A1 * | 9/2002 | Cooper | 455/411 |
| 2002/0128030 | A1 * | 9/2002 | Eiden et al. | 455/519 |
| 2002/0151326 | A1 * | 10/2002 | Awada et al. | 455/556 |
| 2002/0155828 | A1 * | 10/2002 | Tuomainen et al. | 455/414 |
| 2002/0160805 | A1 * | 10/2002 | Laitinen et al. | 455/550 |
| 2002/0193102 | A1 * | 12/2002 | Hyyppa et al. | 455/419 |
| 2003/0017805 | A1 * | 1/2003 | Yeung et al. | 455/41 |
| 2004/0203376 | A1 * | 10/2004 | Phillipps | 455/41.2 |

FOREIGN PATENT DOCUMENTS

| DE | 297 20 211 U1 | 4/1998 |
| EP | 1 056 029 A2 | 11/2000 |
| JP | 5-91102 A | 4/1993 |
| JP | 11-163852 A | 6/1999 |
| JP | 2000-285039 A | 10/2000 |
| JP | 2001-27984 A | 1/2001 |
| JP | 2001-92759 A | 4/2001 |
| WO | WO 01/31851 A1 | 5/2001 |

* cited by examiner

Primary Examiner—Nick Corsaro
Assistant Examiner—Tan Trinh
(74) Attorney, Agent, or Firm—Birch, Stewart, Kolasch & Birch, LLP

(57) ABSTRACT

In a system including the first terminal and the second terminal. A communication method at the first terminal includes the steps of preparing its own device name, detecting a request for connection with the second terminal, rewriting the device name in response to the request, and transmitting the changed device name to the second terminal. A communication method at the second terminal includes the steps of receiving device names from a plurality of first terminals, displaying the device names for the user of the second terminal to recognize a changed device name easier than unchanged device names, and communicating with the first terminal specified by a device name selected by the user.

48 Claims, 27 Drawing Sheets

F I G. 1 8
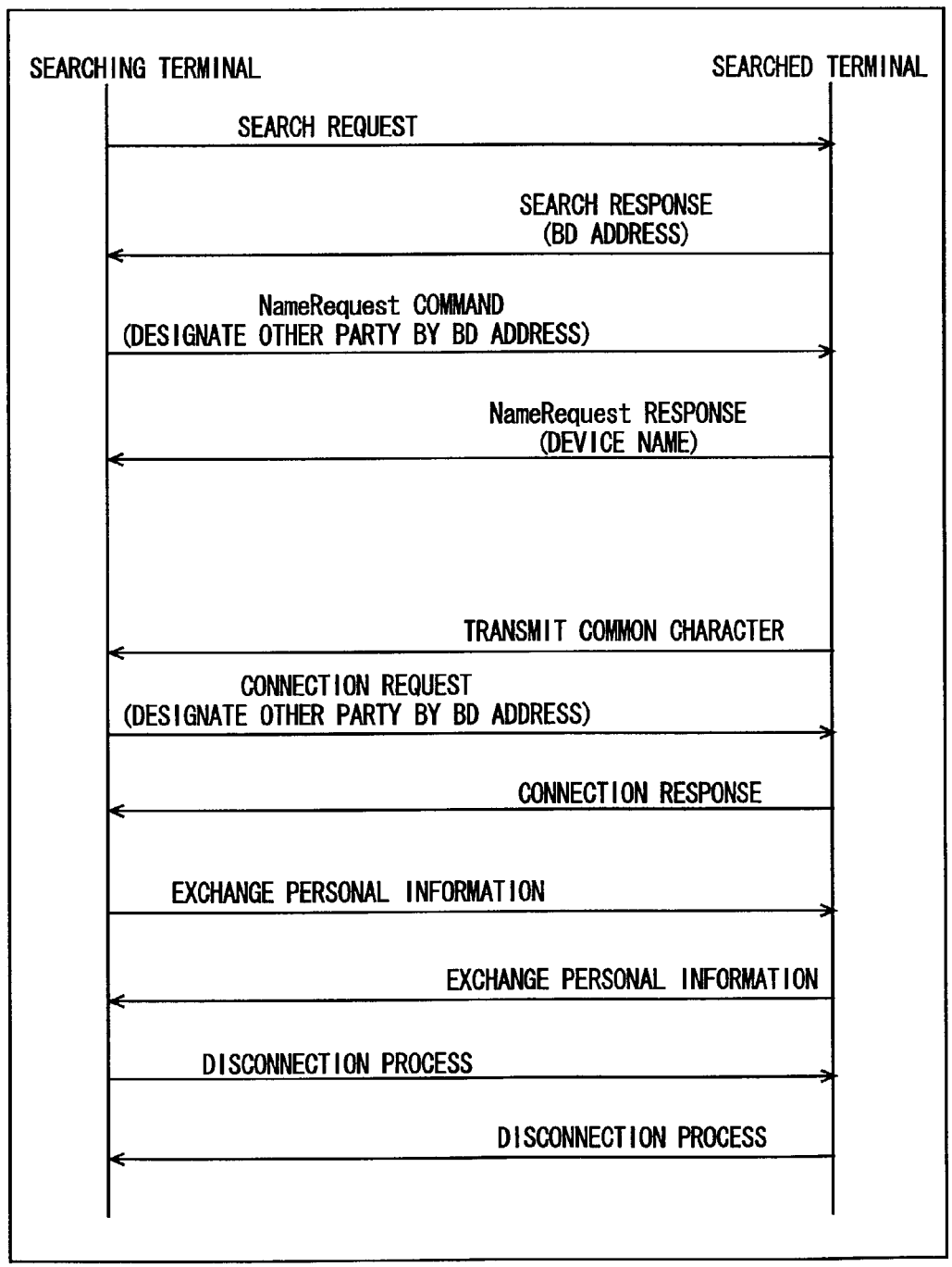

F I G. 1 9

```
<PERSONAL INFORMATION
       EXCHANGE>
SEARCH RESULT
1. ADACHI MOBILE
2. TANABE PERSONAL COMPUTER
3. TODA PERSONAL COMPUTER
4. YAMADA MOBILE
5. SATO MOBILE
6. OFFICE FAX
7. ADACHI PERSONAL COMPUTER
```

FIG. 33

<PERSONAL INFORMATION EXCHANGE>

XXX IS REQUESTING CONNECTION. DO YOU ACCEPT THE REQUEST ?
①YES
②NO

FIG. 34

<PERSONAL INFORMATION EXCHANGE>

PERSONAL INFORMATION NOW EXCHANGING

FIG. 43

```
<PERSONAL INFORMATION
  EXCHANGE>
YOU HAVE EXCHANGED
PERSONAL INFORMATION WITH
THE FOLLOWING DEVICES
  1. ADACHI MOBILE
  2. TANABE PHS
  3. TODA MOBILE
PRESS ANY BUTTON
```

COMMUNICATION SYSTEM, TERMINAL, COMMUNICATION METHOD, AND RECORDING MEDIUM RECORDING COMMUNICATION METHOD PROGRAM FOR SELECTING TERMINAL OF COMMUNICATION PARTY

BACKGROUND OF THE INVENTION

1. Field of the Invention

The present invention relates to a technique of searching for and connecting with a terminal of a communication party in wireless communication, and more particularly, to a technique allowing a user to readily search for and connect with a terminal of a communication party in short-range wireless communication.

2. Description of the Background Art

Recently, a short-range communication technique called Bluetooth has been put into practical use. The communication technique is capable of wireless communication with data communication speed of 1 M bit/sec within a communication range of 10 m. The communication speed and communication range are kept so low that reduced cost and low power consumption of a communication device can be realized. Such a Bluetooth device is mounted on a mobile phone, a mobile terminal, a personal computer, electrical home appliance and the like. A network can be constructed for data communication between such apparatuses using the Bluetooth device.

The constructed network can be used to implement various applications. For instance, a Bluetooth device is mounted to a mobile phone in addition to a communication circuit for communicating with other telephone devices. The user stores personal information into his/her own mobile phone including his/her address, phone number and the like. When the user meets someone for the first time, he/she can use the Bluetooth device to send the personal information from the user's mobile phone to the other person's mobile phone, instead of giving a business card.

The communication technique allows data communication within the range of 10 m, which is a communication coverage. Thus, in the above-described example, if a mobile phone of another person with which the user desires no data communication exists within the communication coverage by the user's mobile phone, the personal information may be transmitted to that person's mobile phone. Thus, the communication technique goes through a procedure for specifying the terminal of a communication party before establishing a communication line between the user and the terminal of the communication party.

In the procedure, the mobile phone of the user requesting for communication searches for the terminal of the communication party that is present within the communication coverage. The terminal within the communication coverage transmits an address specifying its home station when the communication device is in an active, i.e. standby, state. The mobile phone uses the received address to issue a request for a device name to the terminal of the communication party. The terminal that received the request transmits the device name set by the user to the mobile phone. The mobile phone stores the received device name by associating it with the address. The mobile phone displays a list of the received device names. The user of the mobile phone looks for the device name of a desired terminal from a plurality of device names. The user selects a device name and enters the selected device name using a keypad. The mobile phone searches for an address of the terminal based on the entered device name. The mobile phone uses the retrieved address to transmit a connection request command to the terminal. When the user of the terminal enters permission for the terminal to communicate with the mobile phone, the terminal transmits a connection response to the mobile phone. This allows the communication line to be established between the mobile phone and the terminal.

As described above, in the wireless communication including the communication technique called Bluetooth that allows wireless communication with a terminal within a certain area, a procedure is provided, in terms of security, that searches for a terminal within a communication coverage and selects one of the retrieved plurality of terminals. A display unit of the mobile phone is, however, generally too small to display device names of many terminals at once. Moreover, even if such display is possible, it is difficult for the user to determine which terminal is to be connected with the communication line.

SUMMARY OF THE INVENTION

An object of the present invention is to provide a communication system and a terminal used in the communication system, in which a user can readily select the terminal of a desired communication party from a number of terminals.

Another object of the present invention is to provide a communication system and a terminal used in the communication system, in which the user can only communicate with the terminal of a desired communication party among a number of terminals.

A further object of the present invention is to provide a communication system and a terminal used in the communication system, in which the terminal of a communication party can be selected from a number of terminals according to a predetermined condition.

A yet another object of the present invention is to provide a communication system and a terminal used in the communication system, in which a terminal for communication can be selected from a number of terminals in response to a connection request from the terminal of a communication party according to a predetermined condition.

According to an aspect of the present invention, a communication system effects communication between a first terminal and a second terminal. The first terminal includes a storage circuit to store first information for the second terminal to identify the first terminal and second information for a user of the second terminal to identify the first terminal, a detection circuit to detect instruction for connection with the second terminal, and a transmission circuit connected to the storage circuit and the detection circuit, to transmit the first information and the second information to the second terminal in response to the instruction. The second terminal includes a reception circuit to receive the first information and the second information from the first terminal, a determination circuit to determine a manner in which the user of the second terminal recognizes the second information based on the second information, a display circuit to display the second information of the first terminal, and a control circuit connected to the determination circuit and the display circuit, to control the display circuit such that the second information is displayed in the determined manner.

According to the present aspect, when the user of the first terminal desires communication with the second terminal, the second information, for example, is changed and transmitted to the second terminal by the transmission circuit. When, for example, a Bluetooth device is used, the first information is a "BD (Bluetooth Device) address" and the second information is a "device name" transmitted in response to a NameRequest command. The "BD address" is used, when Bluetooth devices communicate with each other, by one device to identify the other party in the communication. The "device name" is registered by the user of the terminal, representing e.g. the full name of the user. The "device name" may be changed. The second terminal that received the changed "device name" displays the second information at the display circuit for the user of the second terminal to more readily recognize the device name, compared to the case with second information unchanged. Thus, the "device name," e.g. the user's full name, of the first terminal that desires connection is presented to the user of the second terminal in preference to the "device name" of the first terminal that desires no connection. Even if there are a number of terminals within the communication coverage, the user of the second terminal can readily select the first terminal that desires connection. As a result, a communication system can be provided in which the user can readily select the terminal of a desired communication party from a number of terminals within a communication coverage. Note that the NameRequest command is for acquiring a device name in Bluetooth.

According to another aspect of the present invention, a communication system effects communication between a first terminal and a second terminal. The first terminal includes a storage circuit to store first information for the second terminal to identify the first terminal and second information for a user of the second terminal to identify the first terminal, a transmission circuit connected to the storage circuit, to transmit the first information and the second information to the second terminal, a detection circuit to detect an instruction for connection with the second terminal, and an instruction transmission circuit connected to the detection circuit, to create third information and to transmit the third information to the second terminal in response to the instruction. The second terminal includes a reception circuit to receive the first information, the second information and the third information from the first terminal, a display circuit to display second information of the first terminal, and a control circuit connected to the display circuit, to control the display circuit such that the second information is displayed in a manner for the user of the second terminal to recognize the second information more readily when the third information is received, compared to when the third information is not received.

According to the present aspect, when the user of the first terminal desires communication with the second terminal, the third information is transmitted to the second terminal by the instruction transmission circuit. The second terminal that received the third information displays the second information at the display circuit for the user of the second terminal to more readily recognize the second information, compared to when the third information is not received, under the control of the control circuit. This allows the "device name" of the first terminal that desires connection to be presented to the user of the second terminal, in preference to the "device name" of the first terminal that desires no connection. Even if there are a number of terminals within a communication coverage, the user of the second terminal can readily select the first terminal that desires connection. As a result, a communication system can be provided in which the user can readily select the terminal of a desired communication party from a number of terminals within a communication coverage.

According to a further aspect of the present invention, a communication system effects communication between a first terminal and a second terminal. The first terminal includes a storage circuit to store information for the second terminal to identify the first terminal, a transmission circuit connected to the storage circuit, to transmit the information to the second terminal, and a creation circuit to create a first code indicating permission for connection with the second terminal. The second terminal includes a reception circuit to receive the information from the first terminal, a creation circuit to create a second code indicating permission for connection with the first terminal, a command transmission circuit connected to the creation circuit, to transmit a connection request command to the first terminal based on the information, and a code transmission circuit to transmit the second code to the first terminal based on the information. The first terminal further includes a command reception circuit to receive the connection request command and the second code from the second terminal, a determination circuit connected to the command reception circuit, to determine whether or not connection is to be made with the second terminal, based on the first code and the second code, and a response command transmission circuit connected to the determination circuit, to transmit a connection response command to the second terminal, based on a result determined by the determination circuit.

According to the present aspect, the first terminal creates the first code when it permits connection with the second terminal. The second terminal creates the second code when it permits the connection with the first terminal. For instance, the same numeral is set for the first and second codes by the respective users of the first and second terminals. The second terminal transmits the connection request command and the second code to the first terminal based on information, e.g. "BD address." Upon reception of the connection request command and the second code, the first terminal determines whether or not connection is to be made, based on the first and second codes, i.e., determines whether or not the codes have the same numeral. If it is determined that the connection is to be made, the connection response command is transmitted from the first terminal to the second terminal to connect a communication line. As a result, a communication system can be provided in which communication can only be made with the terminal of a desired communication party even if there are a number of terminals within a communication coverage.

According to a yet another aspect of the present invention, a first terminal is provided in a communication system effecting communication between a first terminal and a second terminal. The second terminal receives, from the first terminal, first information for the second terminal to identify the first terminal and second information for a user of the second terminal to identify the first terminal, determining a manner in which the user of the second terminal recognizes the second information, based on the second information, and displaying the second information in the manner. The first terminal includes a storage circuit to store the first information and the second information, a detection circuit to detect an instruction for connection with the second terminal, and a transmission circuit connected to the storage circuit and the detection circuit, to transmit the first information and the second information to the second terminal in response to the instruction.

According to the present aspect, when the user of the first terminal desires communication with the second terminal, the second information, for example, is changed and transmitted to the second terminal by the transmission circuit.

The second terminal that received the changed second information, e.g. changed "device name," displays the second information at the display circuit for the user of the second terminal to more readily recognize the information, compared to the case with the second information unchanged. Thus, the "device name" of the first terminal that desires connection is presented to the user of the second terminal in preference to the "device name" of the first terminal that desires no connection. Even if there are a number of first terminals within the communication coverage of the second terminal, the user of the second terminal can readily select the first terminal that desires connection. As a result, a terminal can be provided in which a user can readily select the terminal of a desired communication party from a number of terminals present in a communication coverage.

According to a further aspect of the present invention, a first terminal is provided in a communication system effecting communication between a first terminal and a second terminal. The second terminal receives, from the first terminal, first information for the second terminal to identify the first terminal, second information for a user of the second terminal to identify the first terminal and third information, and displays the second information for the user of the second terminal to recognize the second information more readily when the third information is received, compared to when the third information is not received. The first terminal includes a storage circuit to store the first information and the second information, a transmission circuit connected to the storage circuit, to transmit the first information and the second information to the second terminal, a detection circuit to detect an instruction for connection with the second terminal, and an instruction transmission circuit connected to the detection circuit, to create the third information and to transmit the third information to the second terminal, in response to the instruction.

According to the present aspect, when the user of the first terminal desires communication with the second terminal, the third information is transmitted to the second terminal by the instruction transmission circuit. The second terminal that received the third information displays the second information at the display circuit for the user of the second terminal to more readily recognize the information, compared to when the third information is not received. Thus, the "device name" of the first terminal that desires connection is presented to the user of the second terminal in preference to the "device name" of the first terminal that desires no connection. Even if there are a number of terminals within the communication coverage, the user of the second terminal can readily select the first terminal that desires connection. As a result, a terminal can be provided in which a user can readily select the terminal of a desired communication party from a number of terminals within a communication coverage.

According to another aspect of the present invention, a first terminal is provided in a communication system effecting communication between the first terminal and a second terminal. The first terminal includes a storage circuit to store information for the second terminal to identify the first terminal, a transmission circuit connected to the storage circuit, to transmit the information to the second terminal, and a creation circuit to create a first code indicating permission for connection with the second terminal. The second terminal receives the information from the first terminal, creates a second code indicating permission for connection with the first terminal, and transmits a connection request command and the second code to the first terminal based on the information. The first terminal further includes a command reception circuit to receive the connection request command and the second code from the second terminal, a determination circuit connected to the command reception circuit, to determine whether or not connection is to be made with the second terminal, based on the first code and the second code, and a response command transmission circuit connected to the determination circuit, to transmit a connection response command to the second terminal based on a result determined by the determination circuit.

According to the present aspect, the first terminal creates the first code when it permits connection with the second terminal. The second terminal creates the second code when it permits connection with the first terminal. For instance, the same numeral is set for the first and second codes by the users of the first and second terminals. The second terminal transmits the connection request command and the second code to the first terminal based on information, e.g., "BD address." Upon reception of the connection request command and the second code, the first terminal determines whether or not connection is made based on the first and the second codes, i.e., determines whether or not the codes have the same numeral. If it is determined that the connection is made, the connection response command is transmitted from the first terminal to the second terminal, to connect a communication line. As a result, a terminal can be provided that can communicate only with the terminal of a desired communication party among a number of terminals that may be present within a communication coverage.

More preferably, the first terminal further includes a circuit to transmit a transmission request command requesting for transmission of the second code to the second terminal. The second terminal transmits the second code to the first terminal in response to the transmission request command received from the first terminal.

Thus, upon reception of the connection request command from the second terminal, the first terminal transmits the transmission request command to the second terminal in order to receive a code for determining if connection is to be made with the second terminal. The first terminal determines whether or not the connection is to be made, based on the second code transmitted from the second terminal in response to the transmission request command and the first code created by the first terminal. This allows determination to be performed for the connection based on the codes, only when the second terminal issues a request for the determination based on the codes.

More preferably, in the first terminal, the code is created based on data indicating date and time at which an instruction is given for creation of the code.

Thus, the users of the first and second terminals simultaneously instruct the respective terminals to create codes. The terminals create codes, respectively, based on data of the instructed date and time (date, hour and minutes) according to a predetermined calculation method. The first terminal can determine whether or not the code calculated from the date/time data when it determines whether or not connection is to be made with the second terminal.

More preferably, the code includes first data based on date and time at which an instruction is given for creation of the code and second data identifying terminals that belong to a same category according to a predetermined rule. The determination circuit includes a circuit to determine whether or not connection is to be made with the second terminal, based on the first data and the second data.

According to the invention, a plurality of terminals are divided into at least two categories to communicate with one another according to such a rule that terminals belonging to the same category do not communicate with each other for exchanging data and that terminals belonging to different categories communicate with each other for exchanging data. The users at the plurality of terminals belonging to the same category (for instance, one company forms one category when personal information data are exchanged), simultaneously press the same numeric key. By determining whether or not communication is made based on thus created first and second data, terminals belonging to different categories communicate with each other to exchange personal information, while terminals belonging to the same category do not communicate with each other.

According to a further aspect of the present invention, a second terminal is provided in a communication system effecting communication between a first terminal and the second terminal. The first terminal stores first information for the second terminal to identify the first terminal and second information for a user of the second terminal to identify the first terminal, and transmits the first information and the second information to the second terminal when an instruction for connection with the second terminal is detected. The second terminal includes a reception circuit to receive the first information and the second information from the first terminal, a determination circuit connected to the reception circuit, to determine a manner in which the user of the second terminal recognizes the second information, based on the second information, a display circuit to display the second information of the first terminal, and a control circuit connected to the determination circuit and the display circuit, to control the display circuit such that the second information is displayed in the determined manner.

According to the present aspect, when the user of the first terminal desires communication with the second terminal, the second information, for example, is transmitted to the second terminal. The second terminal that received changed second information, e.g. changed "device name," displays the second information at the display circuit, under the control of the control circuit, for the user of the second terminal to more readily recognize the information, compared to the case with the second information unchanged. Thus, the "device name" of the first terminal that desires connection is presented to the user of the second terminal in preference to the "device name" of the first terminal that desires no connection. Even if there are a number of first terminals within the communication coverage of the second terminal, the user of the second terminal can readily select the first terminal that desires connection. As a result, a terminal can be provided in which the user can readily select the terminal of a desired communication party from a number of terminals within a communication coverage.

According to yet another aspect of the present invention, a second terminal is provided in a communication system effecting communication between a first terminal and the second terminal. The first terminal stores first information for the second terminal to identify the first terminal and second information for a user of the second terminal to identify the first terminal, transmitting the first information and the second information to the second terminal, and transmits third information to the second terminal in response to an instruction for connection with the second terminal. The second terminal includes a reception circuit to receive the first information, the second information and the third information from the first terminal, a display circuit to display the second information of the first terminal, and a control circuit connected to the display circuit, to control the display circuit such that the second information is displayed in a manner for the user of the second terminal to recognize the second information more readily when the third information is received, compared to when the third information is not received.

According to the present aspect, when the user of the first terminal desires communication with the second terminal, the third information is transmitted to the second terminal. The second terminal that received the third information displays the second information at the display circuit, under the control of the control circuit, for the user of the second terminal to more readily recognize the information, compared to when the third information is not received. Thus, the "device name" of the first terminal that desires connection is presented to the user of the second terminal in preference to the "device name" of the first terminal that desires no connection. Even if there are a number of terminals within the communication coverage, the user of the second terminal can readily select the first terminal that desires connection. As a result, a terminal can be provided in which the user can readily select the terminal of a desired communication party from a number of terminals within a communication coverage.

More preferably, the second terminal further includes an input circuit to input data specifying a first terminal to be connected with the second terminal, determined by the user of the second terminal based on the second information displayed on the display circuit, and a command transmission circuit connected to the input circuit, to transmit a connection request command to the first terminal based on first information of a first terminal specified by the data.

According to the present aspect, the first terminal that desires connection with the second terminal is displayed with higher priority at the display circuit in the second terminal. The user of the second terminal selects the first terminal to be connected, based on the display. The command transmission circuit transmits the connection request command to the selected first terminal. When the first terminal transmits the connection response command to the second terminal, the first and second terminals are connected with each other.

According to a further aspect of the present invention, a second terminal is provided in a communication system effecting communication between the first terminal and the second terminal. The first terminal transmits information for the second terminal to identify the first terminal, to the second terminal, creates a first code indicating permission for connection with the second terminal, and determines whether or not connection is to be made with the second terminal based on a second code received from the second terminal and the first code. The second terminal includes a reception circuit to receive the information from the first terminal, a creation circuit to create a second code indicating permission for connection with the first terminal, a command transmission circuit connected the creation circuit, to transmit a connection request command to the first terminal based on the information, and a code transmission circuit to transmit the second code to the first terminal based on the information.

According to the present aspect, the first terminal creates the first code when it permits connection with the second terminal. The second terminal creates the second code when it permits connection with the first terminal. The second terminal transmits the connection request command and the second code to the first terminal, based on information. Upon reception of the connection request command and the second code, the first terminal determines whether or not connection is to be made, based on the first and second codes. If it is determined that the connection is to be made, the first terminal transmits the connection response command to the second terminal, to connect a communication line. As a result, a terminal can be provided that can communicate only with the terminal of a desired communication party among a number of terminals that may be present within the communication coverage.

More preferably, the second terminal further includes a circuit to transmit the second code to the first terminal in response to the transmission request command received from the first terminal. The first terminal transmits, to the second terminal, a transmission request command requesting for transmission of the second code.

Thus, upon reception of the connection request command from the second terminal, the first terminal transmits the transmission request command to the second terminal in order to receive a code for determining if connection is to be made with the second terminal. The first terminal determines whether or not the connection is made, based on the second code transmitted from the second terminal in response to the transmission request command and the first code created by the first terminal. This allows determination to be performed for connection based on the codes, only when the second terminal issues a request for the determination based on the codes.

More preferably, the code is created based on data indicating date and time at which an instruction is given for creation of the code.

Thus, the users of the first and second terminals simultaneously instruct the respective terminals to create codes. The terminals create codes, respectively, based on data of the instructed date and time according to a predetermined calculation method. The first terminal can determine whether or not the code calculated from the date/time data when it determines whether or not connection is to be made with the second terminal.

According to a still further aspect of the present invention, a communication method is provided at a first terminal in a communication system effecting communication between the first terminal and a second terminal. The second terminal receives, from the first terminal, first information for the second terminal to identify the first terminal and second information for a user of the second terminal to identify the first terminal, determines a manner in which the user of the second terminal recognizes the second information, based on the second information, and displays the second information in the manner. The communication method includes the steps of preparing the first information and the second information, detecting an instruction for connection with the second terminal, and transmitting the first information and the second information to the second terminal in response to the instruction.

According to the present aspect, when the user of the first terminal desires communication with the second terminal, the second information, for example, is changed to be transmitted to the second terminal. The second terminal that received the changed second information, e.g. changed "device name," displays the second information for the user of the second terminal to more readily recognize the information, compared to the case with the second information unchanged. Thus, the "device name" of the first terminal that desires connection is presented to the user of the second terminal in preference to the "device name" of the first terminal that desires no connection. Even if there are a number of first terminals within the communication coverage of the second terminal, the user of the second terminal can readily select the first terminal that desires connection. As a result, a communication method can be provided in which the user can readily select the terminal of a desired communication party from a number of terminals within a communication coverage.

According to another aspect of the present invention, a communication method is provided at a first terminal in a communication system effecting communication between the first terminal and a second terminal. The second terminal receives, from the first terminal, first information for the second terminal to identify the first terminal, second information for a user of the second terminal to identify the first terminal and third information, and displays the second information in a manner for the user of the second terminal to recognize the second information more readily when the third information is received, compared to when the third information is not received. The communication method includes the steps of preparing the first information and the second information, transmitting the first information and the second information to the second terminal, detecting an instruction for connection with the second terminal, and creating third information and transmitting the third information to the second terminal in response to the instruction.

According to the present aspect, when the user of the first terminal desires communication with the second terminal, the third information is transmitted to the second terminal. The second terminal that received the third information displays the second information for the user of the second terminal to more readily recognize the information, compared to when the third information is not received. Thus, the "device name" of the first terminal that desires connection is presented to the user of the second terminal in preference to the "device name" of the first terminal that desires no connection. Even if there are a number of terminals within the communication coverage, the user of the second terminal can readily select the first terminal that desires connection. As a result, a communication method can be provided in which the user can readily select the terminal of a desired communication party from a number of terminals within a communication coverage.

According to a further aspect of the present invention, a communication method is provided at a first terminal in a communication system effecting communication between the first terminal and a second terminal. The communication method includes the steps of preparing information for the second terminal to identify the first terminal, transmitting the information to the second terminal, and creating a first code indicating permission for connection with the second terminal. The second terminal receives the information from the first terminal, creates a second code indicating permission for connection with the first terminal, and transmits a connection request command and the second code to the first terminal based on the information. The communication method further includes the steps of receiving the connection request command and the second code from the second terminal, determining whether or not connection is to be made with the second terminal, based on the first code and the second code, and transmitting a connection response command to the second terminal, based on a determination result at the step of determining whether or not connection is to be made with the second terminal.

According to the present aspect, the first terminal creates the first code when it permits connection with the second terminal. The second terminal creates the second code when it permits the connection with the first terminal. The second terminal transmits the connection request command and the second code to the first terminal based on information. Upon reception of the connection request command and the second code, the first terminal determines whether or not connection is to be made, based on the first and second codes, i.e., determines whether or not the codes have the same numeral. If it is determined that the connection is to be made, the connection response command is transmitted from the first terminal to the second terminal to connect a communication line. As a result, a communication method can be provided in which communication can only be made with the terminal of a desired communication party among a number of terminals that may be present within a communication coverage.

According to a further aspect of the present invention, a communication method is provided at a second terminal in a communication system effecting communication between a first terminal and the second terminal. The first terminal stores first information for the second terminal to identify the first terminal and second information for a user of the second terminal to identify the first terminal, and transmits the first information and the second information to the second terminal when an instruction for connection with the second terminal is detected. The communication method includes the steps of receiving the first information and the second information from the first terminal, determining a manner in which a user of the second terminal recognizes the second information based on the second information, displaying the second information of the first terminal, and controlling the step of displaying the second information such that the second information is displayed in the determined manner.

According to the present aspect, when the user of the first terminal desires communication with the second terminal, the second information, for example, is transmitted to the second terminal. The second terminal that received changed second information, e.g. changed "device name," displays the second information for the user of the second terminal to more readily recognize the information, compared to the case with the second information unchanged. Thus, the "device name" of the first terminal that desires connection is presented to the user of the second terminal in preference to the "device name" of the first terminal that desires no connection. Even if there are a number of first terminals within the communication coverage of the second terminal, the user of the second terminal can readily select the first terminal that desires connection. As a result, a communication method can be provided in which the user can readily select the terminal of a desired communication party from a number of terminals within a communication coverage.

According to a further aspect of the present invention, a communication method is provided at a second terminal in a communication system effecting communication between a first terminal and the second terminal. The first terminal stores first information for the second terminal to identify the first terminal and second information for a user of the second terminal to identify the first terminal, transmits the first information and the second information to the second terminal, and transmits third information to the second terminal in response to an instruction for connection with the second terminal. The communication method includes the steps of receiving the first information, the second information and the third information, from the first terminal, displaying the second information of the first terminal, and controlling the step of displaying the second information such that the second information is displayed in a manner for the user of the second terminal to recognize the second information more readily when the third information is received, compared to when the third information is not received.

According to the present aspect, when the user of the first terminal desires communication with the second terminal, the third information is transmitted to the second terminal. The second terminal that received the third information displays the second information for the user of the second terminal to more readily recognize the information, compared to when the third information is not received. Thus, the "device name" of the first terminal that desires connection is presented to the user of the second terminal in preference to the "device name" of the first terminal that desires no connection. Even if there are a number of terminals within the communication coverage, the user of the second terminal can readily select the first terminal that desires connection. As a result, a communication method can be provided in which the user can readily select the terminal of a desired communication party from a number of terminals within a communication coverage.

According to a further aspect of the present invention, a communication method is provided at a second terminal in a communication system effecting communication between a first terminal and the second terminal. The first terminal transmits information for the second terminal to identify the first terminal, to the second terminal, creates a first code indicating permission for connection with the second terminal, and determining whether or not connection is made with the second terminal, based on a second code received from the second terminal and the first code. The communication method includes the steps of receiving the information from the first terminal, creating the second code indicating permission for connection with the first terminal, transmitting a connection request command to the first terminal based on the information, and transmitting the second code to the first terminal based on the information.

According to the present aspect, the first terminal creates the first code when it permits connection with the second terminal. The second terminal creates the second code when it permits the connection with the first terminal. The second terminal transmits the connection request command and the second code to the first terminal based on information. Upon reception of the connection request command and the second code, the first terminal determines whether or not connection is to be made, based on the first and second codes. If it is determined that the connection is to be made, the connection response command is transmitted from the first terminal to the second terminal, to connect a communication line. As a result, a communication system can be provided in which communication can only be made with the terminal of a desired communication party even if there are a number of terminals within a communication coverage.

According to another aspect of the present invention, a recording medium records a program for communication using a computer, in a communication system effecting communication between the computer and a terminal. The terminal receives, from the computer, first information for the terminal to identify the computer and second information for a user of the terminal to identify the computer, determines a manner in which the user of the terminal recognizes the second information, based on the second information, and displays the second information in the manner. The program makes the computer execute a preparation procedure for preparing the first information and the second information, a detection procedure for detecting an instruction for connection with the terminal, and a transmission procedure for transmitting the first information and the second information to the terminal, in response to the instruction.

According to the present aspect, when the user of the computer desires communication with the terminal, the second information, for example, is changed and transmitted to the terminal by a transmission procedure. The terminal that received changed second information, e.g. changed "device name" when the computer is mounted on a Bluetooth device, displays the second information for the user of the terminal to more readily recognize the information, compared to the case with the second information unchanged. Thus, the "device name" of a computer that desires connection is presented to the user of the second terminal in preference to the "device name" of a computer that desires no connection. Even if there are a number of computers within the communication coverage of the terminal, the user of the terminal can readily select the computer that desires connection. As a result, a program can be provided in which the user can readily select the terminal of a desired communication party from a number of terminals within a communication coverage.

According to a further aspect of the present invention, a recording medium records a program for communication using a computer, in a communication system effecting communication between a computer and a terminal. The terminal receives, from the computer, first information for the terminal to identify the computer, second information for a user of the terminal to identify the computer and the third information, and displays the second information in a manner for the user of the terminal to recognize the second information more readily when the third information is received, compared to when the third information is not received. The program makes the computer execute a preparation procedure for preparing the first information and the second information, a transmission procedure for transmitting the first information and the second information to the terminal, a detection procedure for detecting an instruction for connection with the terminal, and an instruction transmission procedure for creating third information and transmitting the third information in response to the instruction.

According to the present aspect, when the user of the computer desires communication with the terminal, the third information is transmitted to the terminal by the instruction transmission procedure. The terminal that received the third information displays the second information for the user of the terminal to more readily recognize the information, compared to when the third information is not received. Thus, the "device name" of a computer that desires connection is presented to the user of the terminal in preference to the "device name" of a computer that desires no connection. Even if there are a number of terminals within the communication coverage, the user of the terminal can readily select the computer that desires connection. As a result, a program can be provided in which the user can readily select the terminal of a desired communication party from a number of terminals within a communication coverage.

According to a further aspect of the present invention, a recording medium records a program for communication using a computer, in a communication system effecting communication between the computer and a terminal. The program makes the computer execute a preparation procedure for preparing information for the terminal to identify the computer, a transmission procedure for transmitting the information to the terminal, and a creation procedure for creating a first code indicating permission for connection with the terminal. The terminal receives the information from the computer, creates a second code indicating permission for connection with the computer, and transmits a connection request command and the second code to the computer based on the information. The program further makes the computer execute a command reception procedure for receiving the connection request command and the second code from the terminal, a determination procedure for determining whether or not connection is to be made with the terminal based on the first code and the second code, and a response command transmission procedure for transmitting a connection response command to the terminal based on a determination result by the determination procedure.

According to the present aspect, the computer creates the first code when it permits connection with the terminal. The terminal creates the second code when it permits the connection with the computer. The terminal transmits the connection request command and the second code to the computer based on information. Upon reception of the connection request command and the second code, the computer determines whether or not connection is to be made, based on the first and second codes, i.e., determines whether or not the codes have the same numeral. If it is determined that the connection is to be made, the connection response command is transmitted from the computer to the terminal, to connect a communication line. As a result, a program can be provided in which communication can only be made with the terminal of a desired communication party even if there are a number of terminals within a communication coverage.

According to a further aspect of the present invention, a recording medium records a program for communication using a computer, in a communication system effecting communication between the computer and a terminal. The terminal stores first information for the computer to identify the terminal and second information for a user of the computer to identify the terminal, and transmits the first information and the second information to the computer when an instruction for connection with the computer is detected. The program makes the computer execute a reception procedure for receiving the first information and the second information from the terminal, a determination procedure for determining a manner in which a user of the computer recognizes the second information, based on the second information, a display procedure for displaying the second information of the terminal, and a control procedure for controlling the display procedure such that the second information is displayed in the determined manner.

According to the present aspect, when the user of the terminal desires communication with the computer, the second information, for example, is transmitted to the computer. The computer that received changed second information, e.g. changed "device name" when the computer is mounted on a Bluetooth device, is controlled by the control procedure such that the user of the computer can more readily recognize the information, compared to the case with the second information unchanged, to display the second information at the display procedure. Thus, the "device name" of a terminal that desires connection is presented to the user of the computer in preference to the "device name" of a terminal that desires no connection. Even if there are a number of terminals within the communication coverage of the computer, the user of the computer can readily select the computer that desires connection. As a result, a program can be provided in which the user can readily select the terminal of a desired communication party from a number of terminals within a communication coverage.

According to a further aspect of the present invention, a recording medium records a program for communication using a computer, in a communication system effecting communication between the computer and a terminal. The terminal stores first information for the computer to identify the terminal and second information for a user of the computer to identify the terminal, transmits the first information and the second information to the computer, and transmits third information to the computer in response to an instruction for connection with the computer. The program makes the computer execute a reception procedure for receiving the first information, the second information and the third information from the terminal, a display procedure for displaying the second information of the terminal, and a control procedure for controlling the display procedure such that the second information is displayed in a manner for the user of the computer to recognize the second information more readily when the third information is received, compared to when the third information is not received.

According to the present aspect, when the user of the terminal desires communication with the computer, the third information is transmitted to the computer. The computer that received the third information is controlled by the control procedure such that the second information is displayed at the display procedure, for the user of the computer to more readily recognize the second information, compared to when the third information is not received. Thus, the "device name" of a terminal that desires connection is presented to the user of the computer in preference to the "device name" of a terminal that desires no connection. Even if there are a number of terminals within the communication coverage, the user of the computer can readily select the terminal that desires connection. As a result, a program can be provided in which the user can readily select the terminal of a desired communication party from a number of terminals within a communication coverage.

According to a further aspect of the present invention, a recording medium records a program for communication using a computer, in a communication system effecting communication between the computer and a terminal. The terminal transmits information for the computer to identify the terminal to the computer, creates a first code indicating permission for connection with the computer, and determines whether or not connection is to be made with the computer, based on a second code received from the computer and the first code. The program makes the computer execute a reception procedure for receiving the information from the terminal, a creation procedure for creating a second code indicating permission for connection with the terminal, a command transmission procedure for transmitting a connection request command to the terminal based on the information, and a code transmission procedure for transmitting the second code to the terminal based on the information.

According to the present aspect, the terminal creates the first code when it permits connection with the computer. The computer creates the second code when it permits the connection with the terminal. The computer transmits the connection request command and the second code to the terminal based on information. Upon reception of the connection request command and the second code, the terminal determines whether or not connection is to be made, based on the first and second codes. If it is determined that the connection is to be made, the connection response command is transmitted from the terminal to the computer, to connect a communication line. As a result, a program can be provided in which communication can only be made with the terminal of a desired communication party even if there are a number of terminals within a communication coverage.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a stage transition view of a communication system according to the second embodiment of the present invention;

FIG. 19 is an example of a screen display of the mobile phone according to the second embodiment of the present invention;

FIGS. 24 to 34 show examples of a screen display of the mobile phone according to the third embodiment of the present invention;

FIGS. 40 to 43 show examples of a screen display of the mobile phone according to the fourth embodiment of the present invention.

DESCRIPTION OF THE PREFERRED EMBODIMENTS

Figure 1:
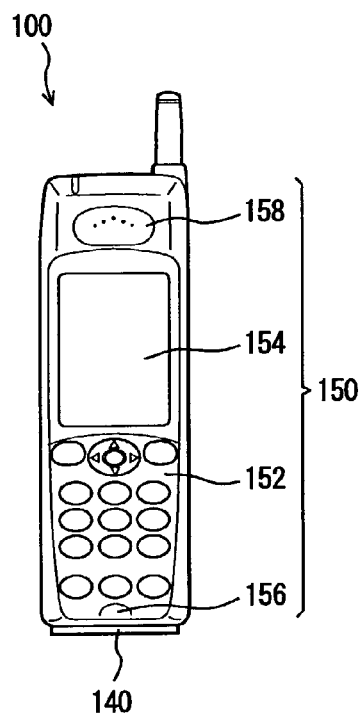
FIG. 1 is an outline view of a mobile phone according to an embodiment of the present invention.

Embodiments of the present invention will be described below with reference to the drawings. In the following description and the drawings, the same parts are denoted by the same reference characters. The name and function thereof are also the same. Therefore, detailed description thereof will not be repeated.

First Embodiment

Referring to FIG. 1, a mobile phone 100 according to the present embodiment includes an input/output unit 150 including an operation portion 152 from which the user enters information, a display portion 154 displaying the information, a sound input portion 156 from which sound is input, and a sound output portion 158 producing sound, and includes a short-range wireless device 140. For display unit 154, e.g., an LCD (Liquid Crystal Display) is used. For short-range wireless device 140, e.g., a Bluetooth device is used. The short-range wireless communication device is, however, not limited thereto. Moreover, the short-range wireless communication device may be mounted to other apparatuses, not limited to the mobile phone.

Figure 2:
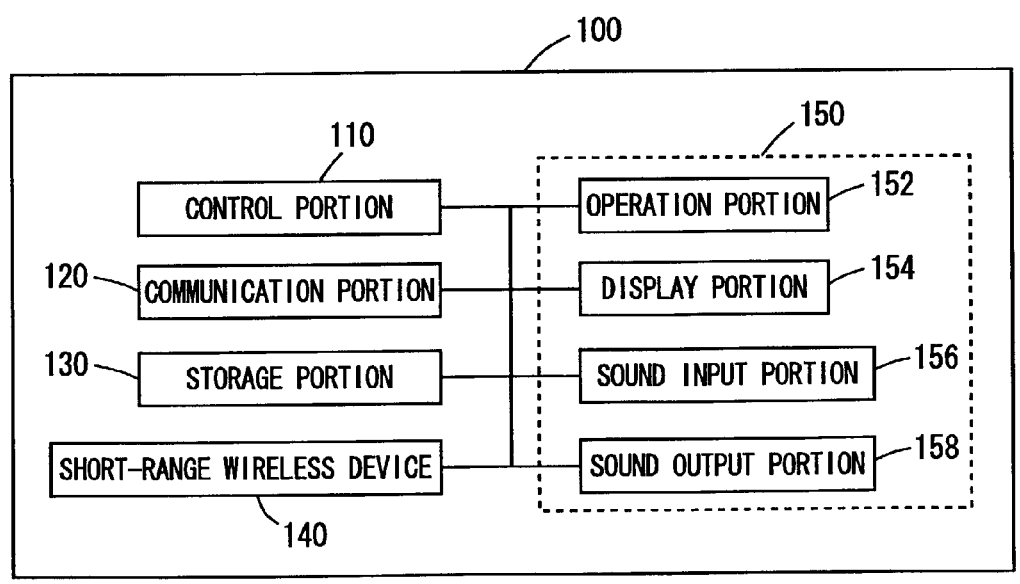
FIG. 2 is a control block diagram of a mobile phone according to an embodiment of the present invention.

Referring to FIG. 2, a control block of mobile phone 100 shown in FIG. 1 is described. As shown in FIG. 2, mobile phone 100 includes a control portion 110 controlling the entire mobile phone 100, a communication portion 120 for communicating with other telephones, a storage portion 130 storing a program executed in control portion 110, intermediate data of the program, and information received via communication portion 120 and short-range wireless device 140, short-range wireless device 140 performing wireless communication with mobile phone 100 having the same type of wireless device mounted thereto, and input/output unit 150.

Operation portion 152 is used by the user of mobile phone 100 to enter, by ten keys or the like, a telephone number of another telephone, a display request for an electronic mail received by communication portion 120, and a display request for personal information of the user of another mobile phone 100 received by short-range wireless device 140.

Display portion 154 displays the number of the other party that was input by operation portion 152, a received electronic mail, received personal information of others and the like. Sound input portion 156 includes a microphone for entering sound. Sound output portion 158 includes a speaker for producing sound.

In mobile phone 100 according to the present embodiment, a method of communicating by the user is implemented by a hardware of mobile phone 100 and a software executed by control portion 110. Such a software is generally stored into storage portion 130 to be executed by control portion 110. The hardware itself of mobile phone 100 shown in FIGS. 1 and 2 is a common one. Therefore, the most essential part of the present invention is the software recorded in storage portion 130. It is noted that the operation of mobile phone 100 itself shown in FIGS. 1 and 2 is well-known, and thus the detailed description thereof will not be repeated here.

Storage portion 130 of mobile phone 100 stores personal information of the user of mobile phone 100. The personal information includes name, address, telephone number and electronic-mail address. The personal information includes the personal information of the user of each mobile phone 100, and the personal information of the user of another mobile phone 100 received via short-range wireless device 140.

In the following description, a "card exchange mode" is discussed in which personal information of the users of respective mobile phones 100 are exchanged with each other using short-range wireless communication device 140. The present invention is, however, not limited to this mode.

Figure 3:
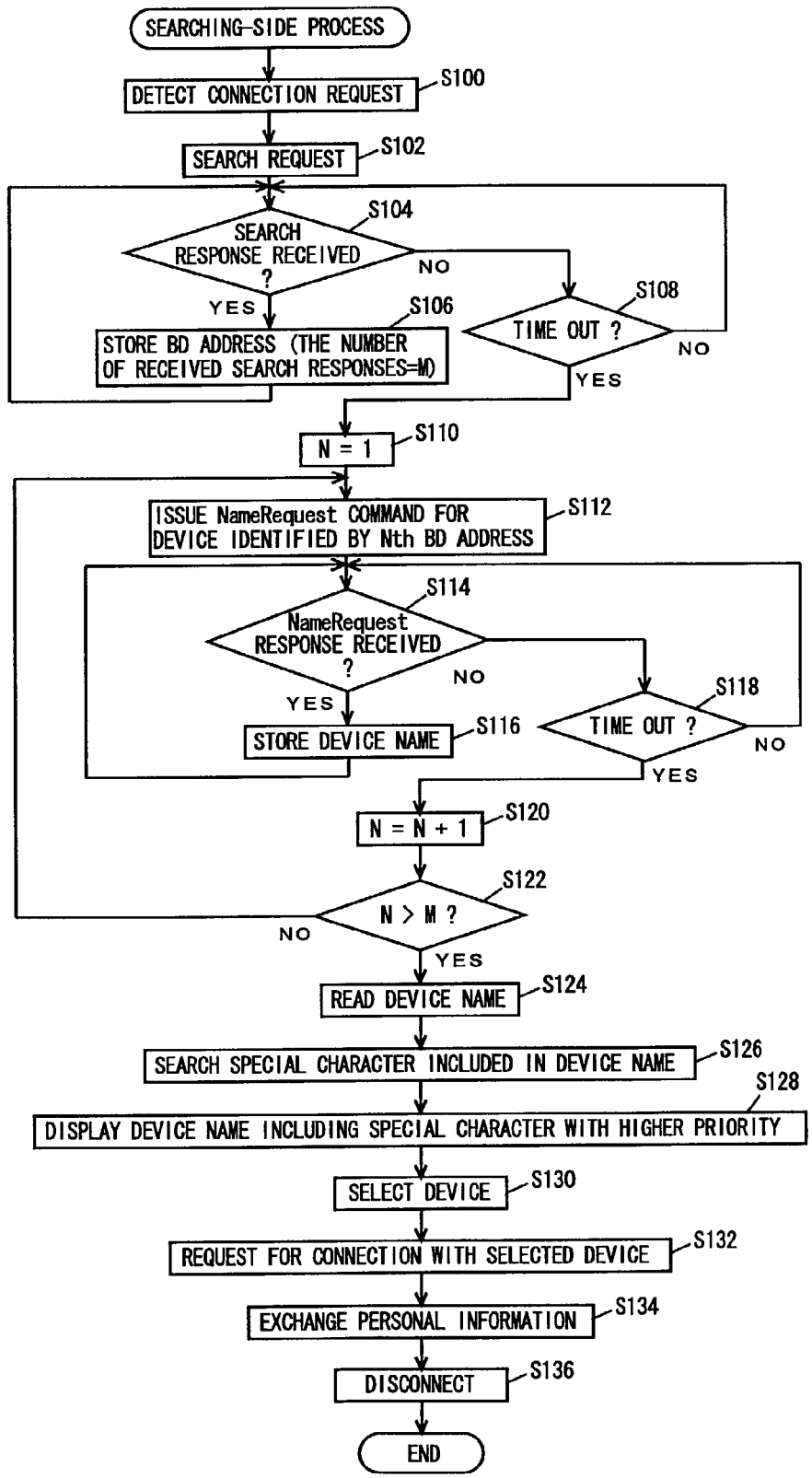
FIG. 3 is a flow chart illustrating a procedure of control in a process on the searching side executed in a mobile phone according to the first embodiment of the present invention.

Referring to FIG. 3, a program executed in mobile phone 100 according to the present embodiment is related to a process on the searching side (hereinafter referred to as "searching-side process"), having a control structure as described below.

At step (hereinafter abbreviated as S) 100, control portion 110 of mobile phone 100 on the searching side detects a connection request. The process is performed based on information entered from operation portion 152 by the user of mobile phone 100 on the searching side. At S102, control portion 110 issues a search request. In this process, control portion 110 searches for mobile phone 100 on the searched side that is capable of wireless communication with mobile phone 100 on the searching side via short-distance wireless device 140. Specifically, control portion 110 instructs short-distance wireless device 140 to transmit a search request command.

At S104, control portion 110 determines whether or not a search response is received from mobile phone 100 on the searched side. When the search response is received from mobile phone 100 on the searched side (YES at S104), the process goes on to S106. If not (NO at S104), the process goes on to S108. It is noted that the search response received in the process at S104 includes a BD address.

At S106, control unit 110 stores the received BD address into storage portion 130. Here, the number of mobile phones from which the search response is received is assumed as M.

At S108, control portion 110 determines whether or not a predetermined time has elapsed since the search request process was performed. If the predetermined time has elapsed (YES at S108), the process goes on to S110. If not (NO at S108), the process goes back to S104, and further waits for reception of the search response.

At S110, control unit 110 initializes a variable N (N=1). At S112, control unit 110 issues a NameRequest command to a device identified by the Nth BD address. At S114, control portion 110 determines whether or not the NameRequest response is received from mobile phone 100 on the searched side. It is noted that the NameRequest response includes a device name. If the NameRequest response is received (YES at S114), a process goes on to S116. It not (NO at S114), the process goes on to S118.

At S116, control portion 110 stores a device name included in the received NameRequest response into storage portion 130. Here, the device name is stored by associating it with the BD address.

At S118, control unit 110 determines whether or not a predetermined time has elapsed since the NameRequest command was issued. If the predetermined time has elapsed (YES at S118), the process goes on to S120. If not (NO at S118), the process goes back to S114, to further wait for reception of the NameRequest response.

At S120, control portion 110 adds 1 to variable N. At S122, control portion 110 determines whether or not variable N is greater than M. If variable N is greater than M (YES at S112), the process goes on to S124. If not (NO at S122), the process goes back to S112, to perform a process for a device identified by the next BD address.

At S124, control portion 110 reads out a device name stored in storage portion 130. At S126, control portion 110 searches for a special character included in the device name. An example of the special character to be searched for is "!" here. At S128, control portion 110 causes display portion 154 to display the device name including such a special character with high priority.

At S130, control portion 110 performs a device selection process. The process is performed based on information entered from operation portion 152 by the user of mobile phone 100 on the searching side. At S132, control portion 110 issues a connection request to mobile phone 100 on the searched side to which the selected device is mounted. At S134, as connection is made with mobile phone 100 including the selected device, personal information are exchanged. At S136, a disconnection process is performed for cutting the communication, when exchange of personal information is terminated.

Figure 4:
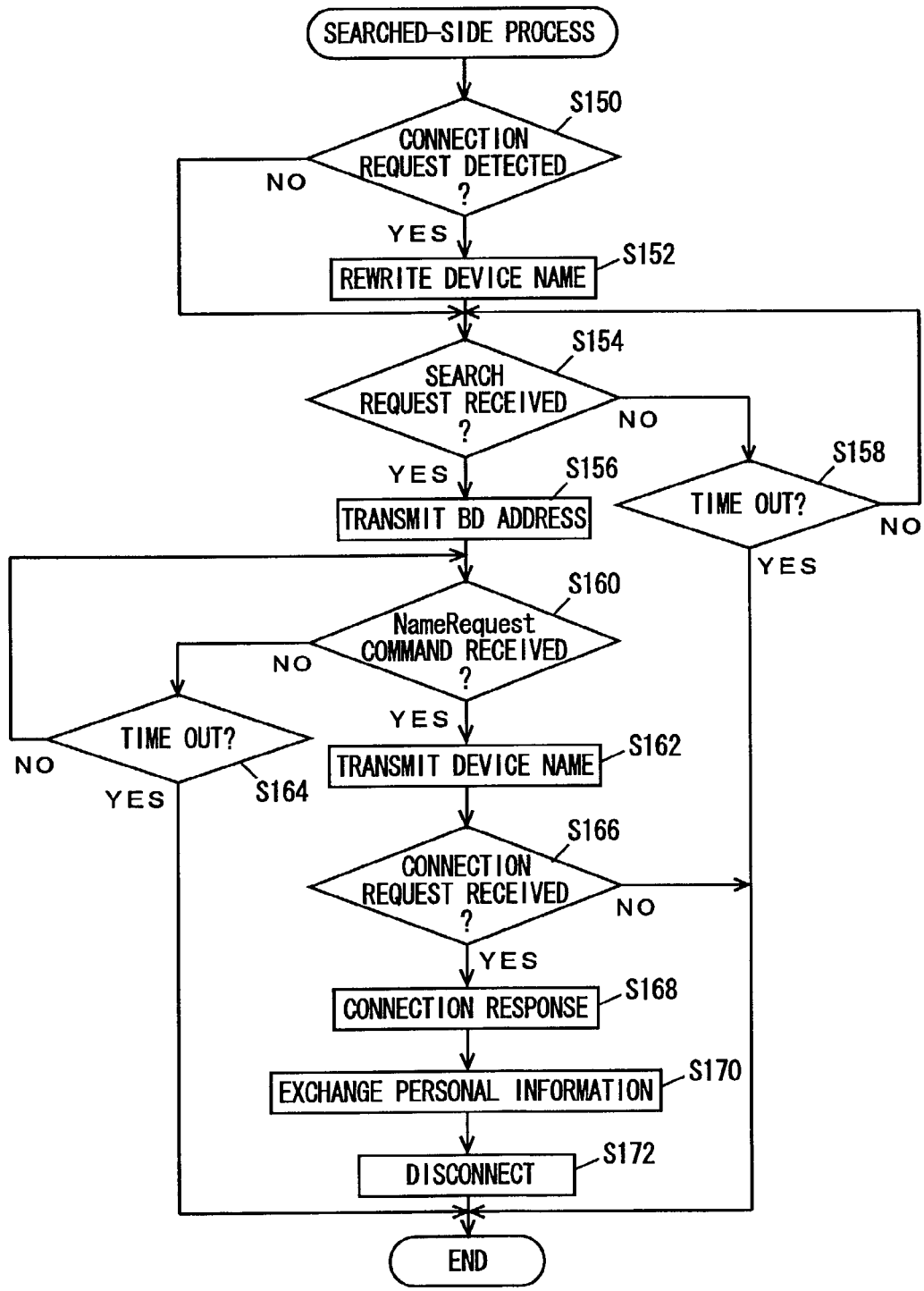
FIG. 4 is a flow chart illustrating a procedure of control in a process on the searched side executed in a mobile phone according to the first embodiment of the present invention.

Referring to FIG. 4, a program executed in mobile phone 100 according to the present embodiment is related to a searched-side process, having a control structure as described below.

At S150, control portion 110 of mobile phone 100 on the searched side determines whether or not the connection request is detected. The determination is performed based on information entered from operation portion 152 by the user of mobile phone 100 on the searched side. The user of mobile phone 100 issues the connection request when he/she wishes to communicate with mobile phone 100 on the searching side. If the connection request is detected (YES at S150), the process goes on to S152. If not (NO at S150), the process goes on to S154.

At S152, control portion 110 rewrites the device name pre-stored in storage portion 130. Here, a special character (e.g."!") is added at the head and end of the pre-stored device name, to rewrite the device name.

At S154, control portion 110 determines whether or not a search request is received from another mobile phone 100. If the search request is received (YES at S154), the process goes on to S156. If not (NO at S154), the process goes on to S158.

At S156, control portion 110 transmits a BD address to another mobile phone 100 that transmitted the search request.

At S158, control portion 110 determines whether or not a predetermined time has elapsed since the connection request was issued. If the predetermined time has elapsed (YES at S158), the process on the searched side (hereinafter referred to as "searched-side process") is terminated. If not (NO at S158), the process goes back to S154, to wait for reception of the search request.

At S160, control portion 110 determines whether or not a NameRequest command is received from another mobile phone 100. If the NameRequest command is received (YES at S160), the process goes on to S162. If not (NO at S160), the process goes on to S164.

At S162, control portion 110 transmits a device name to mobile phone 100 on the searching side that transmitted the NameRequest command. Here, a pre-stored device name or a rewritten device name is transmitted.

At S164, control portion 110 determines whether or not a predetermined time has elapsed since the BD address was transmitted. If the predetermined time has elapsed (YES at S164), the searched-side process is terminated. If not (NO at S164), the process goes back to S160, to wait for reception of the NameRequest command.

At S166, control portion 110 determines whether or not a connection request is received from mobile phone 100 on the searching side. If the connection request is received (YES at S166), the process goes on to S168. If not (NO at S166), the searched-side process is terminated.

At S168, control portion 110 performs a connection response process. In this process, a connection response is transmitted to mobile phone 100 on the searching side. At S170, control portion 110 performs exchange of personal information via wireless communication device 140. In the process at S170, a screen may be displayed for the user of mobile phone 100 on the searched side to confirm whether or not the personal information are to be exchanged. At S172, control portion 110 performs a disconnection process for cutting the communication via wireless communication device 140.

Figure 5:
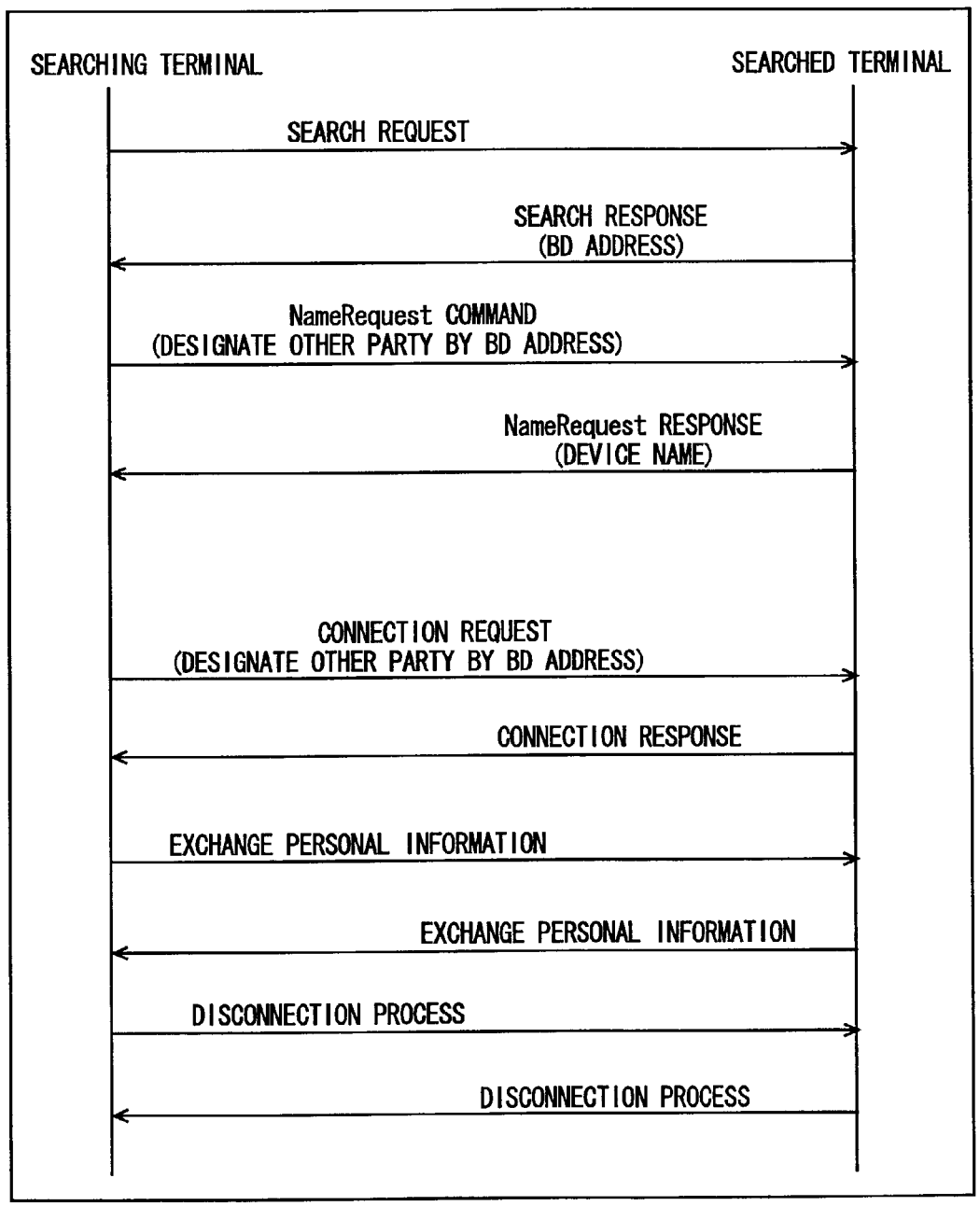
FIG. 5 is a state transition view of a communication system according to the first embodiment of the present invention.

The operation of mobile phone 100 according to the present embodiment based on the structure and flow charts described above will now be described with reference to FIG. 5.

Figure 6:
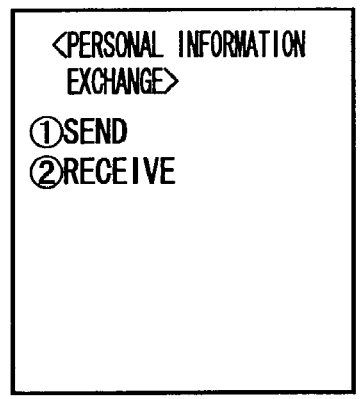
FIGS. 6 to 14 show examples of a screen display of the mobile phone according to the first embodiment of the present invention.
Figure 11:
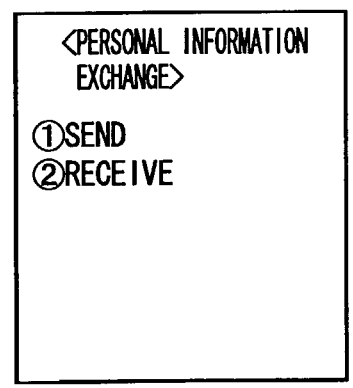

If the connection request is detected at mobile phone 100 on the searching side (S100), a search request command is transmitted to mobile phone 100 on the searched side. Here, a screen shown in FIG. 6 is displayed on display portion 154 of mobile phone 100 on the searching side, for the user of mobile phone 100 on the searching side to select "send." Moreover, display portion 154 of mobile phone 100 on the searched side displays a screen shown in FIG. 11. The user of mobile phone 100 on the searched side selects "receive."

Figure 7:
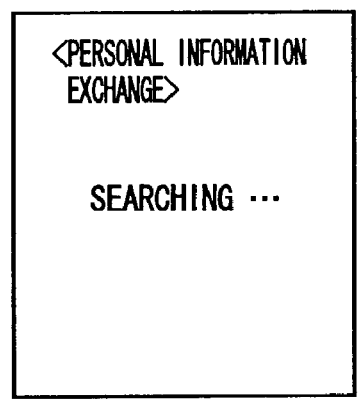

At mobile phone 100 on the searched side, the device name is rewritten (S152). Here, "!" is added to the head and end of the device name pre-stored in storage portion 130. Thereafter, display portion 154 of mobile phone 100 on the searching side displays a screen shown in FIG. 7, while display portion 154 of mobile phone 100 on the searched side displays a screen shown in FIG. 12. If mobile phone 100 on the searched side receives a search request from mobile phone 100 on the searching side (YES at S154), a BD address identifying a device of mobile phone 100 on the searched side is transmitted to mobile phone 100 on the searching side (S156).

If a search response including a BD address is received (YES at S104) before a predetermined time has elapsed (NO at S108), mobile phone 100 on the searching side stores the BD address into storage portion 130 (S106). Mobile phone 100 on the searching side issues a NameRequest command corresponding to the device identified by the first BD address (S112). Here, a mobile phone of a communication party is designated by the BD address received previously. Upon reception of the NameRequest command (YES at S160), mobile phone 100 on the searched side transmits a device name to mobile phone 100 on the searching side (S162). Here, the device name to be transmitted is a pre-stored device name or a device name obtained by rewriting the pre-stored device name. If the device names of the number corresponding to the number of the received search responses are received (YES at S122), the device name stored in storage portion 130 is read out (S124), and a special character ("!" in this example) included in the device name is searched for (S126). The device name including the special character is displayed with higher priority on display portion 154 (S128). Here, as shown in FIG. 8, the device name with an addition of "!" is displayed at the top on display portion 154 of mobile phone 100 on the searching side.

Figure 8:
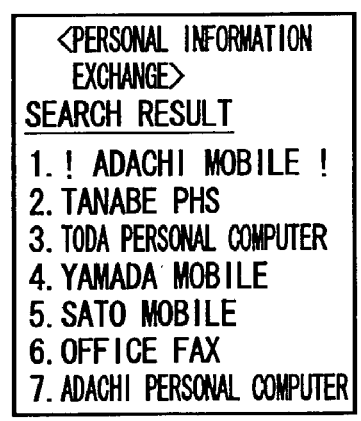
Figure 12:
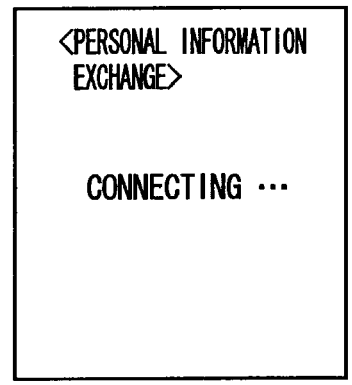
Figure 13:
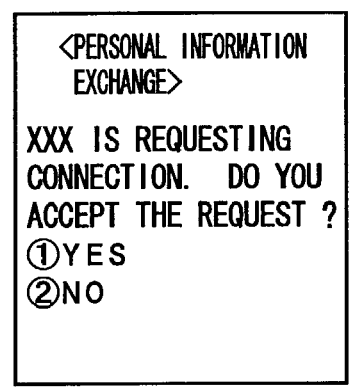

As shown in FIG. 8, the user of mobile phone 100 on the searching side selects a mobile phone to be connected, based on the contents displayed on display portion 154 of mobile phone 100 on the searching side (S130). A connection request is transmitted to the selected device (S132), to commence exchange of personal information. In the exchange of personal information (S124), display portion 154 of mobile phone 100 on the searched side changes its status from a screen indicating a connecting state, as shown in FIG. 12, to a confirmation screen as shown in FIG. 13. After confirmation by the user of mobile phone 100 on the searched side, the personal information are exchanged.

Figure 9:
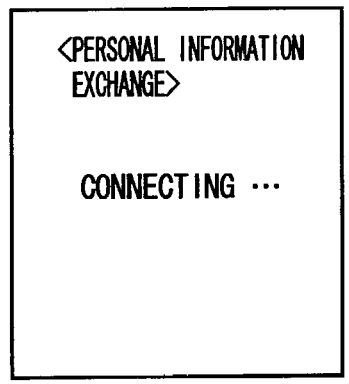
Figure 10:
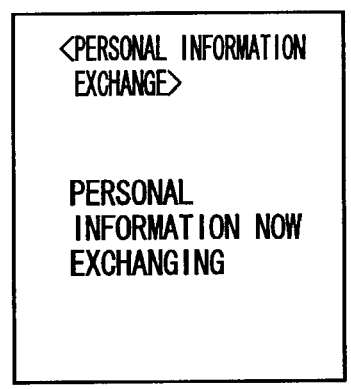
Figure 14:
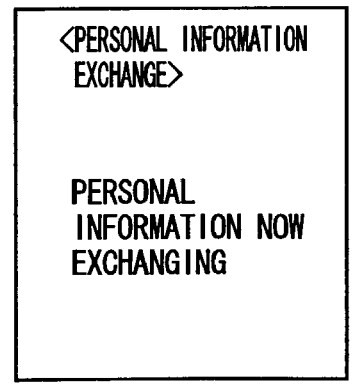

Until mobile phones 100 are connected with each other in the exchange of personal information, display portion 154 of mobile phone 100 on the searching side displays a screen shown in FIG. 9. Moreover, while the personal information are exchanged, display portion 154 of mobile phone 100 on the searching side displays a screen shown in FIG. 10, whereas display portion 154 of mobile phone 100 on the searched side displays a screen shown in FIG. 14. After the personal information are exchanged, mobile phones 100 are disconnected (S136).

As described above, according to the mobile phone in the present embodiment, a short-range wireless device such as Bluetooth is mounted, and the device name of the short-range wireless device is pre-registered. The registered device name can be identified by the user of the mobile phone. If the user of the mobile phone wishes to exchange business cards with another user, the control portion of the mobile phone changes a part of the pre-registered device name. The changed device name is transmitted in response to the NameRequest command. The mobile phone that received the changed device name displays the changed device name on the display portion for the user of the mobile phone to more readily recognize the information. As a result, even if a number of mobile phones are present within a communication coverage of a device to which a short-range wireless communication device is mounted, a mobile phone that desires connection can readily be selected. As a result, the user can readily select a mobile phone of a desired communication party from a number of mobile phones.

It is noted that the display of device names including a changed device name is not limited to the one in which the display order is changed such that the changed device name comes at the top. The changed device name may, for example, be displayed by highlighting, changing the display color, or generating an alarm.

Second Embodiment

A mobile phone according to the second embodiment of the present invention is different from the mobile phone according to the first embodiment described above that transmits the changed device name. The mobile phone according to the present embodiment transmits a special common character such as a numeral that is predetermined between the users who wish to exchange business cards, and changes the display order of the device names to be displayed on the display portion based on the numeral.

Note that, in the description below, the hardware configuration of the mobile phone according to the present embodiment is the same as the hardware configuration of the mobile phone according to the above-described first embodiment. Therefore, detailed description thereof will not be repeated here.

Figure 15:
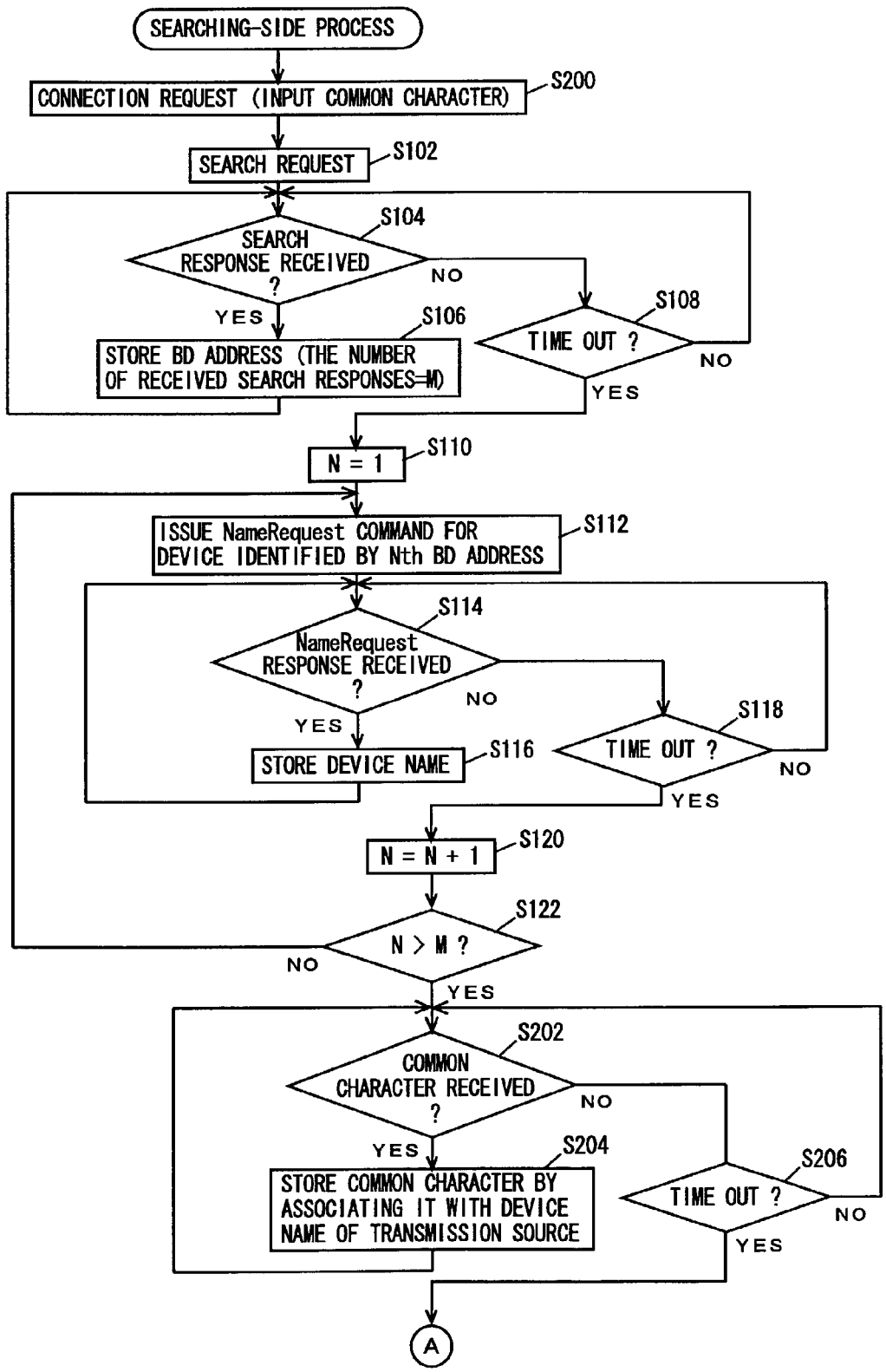
FIGS. 15 and 16 are flow charts illustrating a procedure of control in a process on the searching side executed in a mobile phone according to the second embodiment of the present invention.
Figure 16:
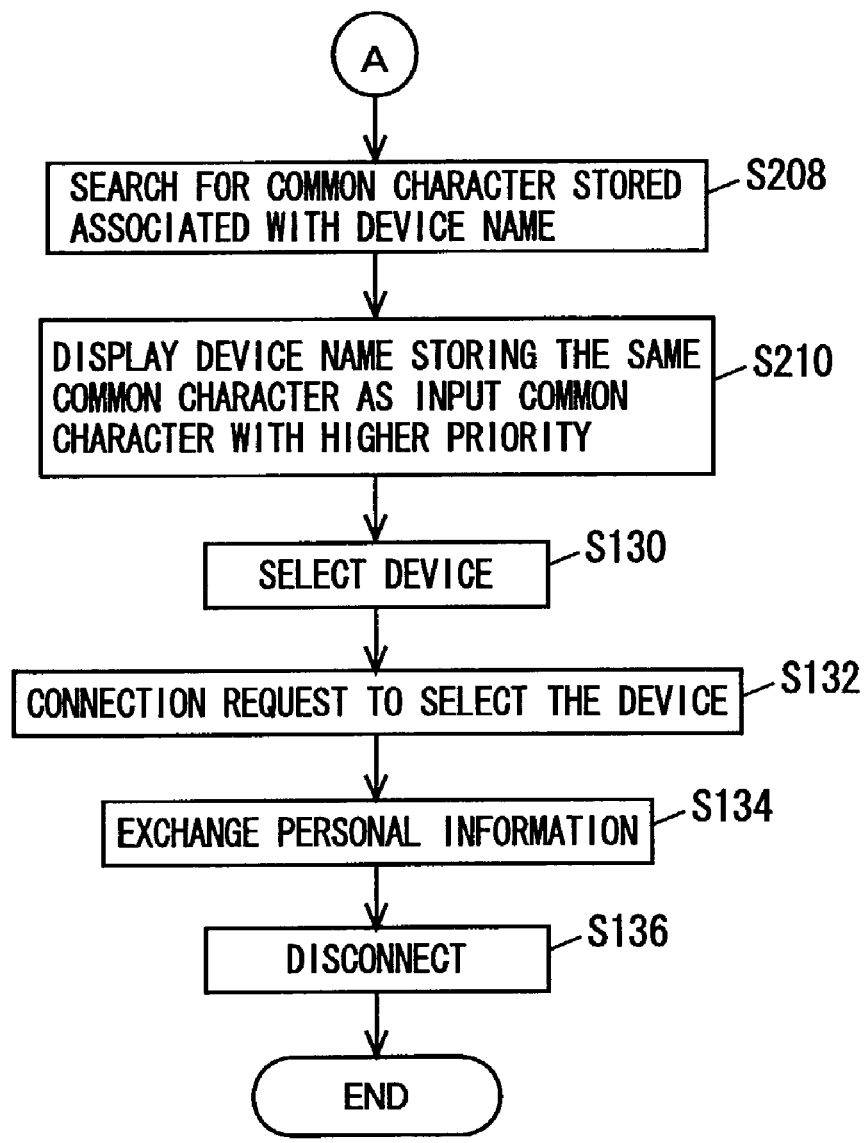

Referring to FIGS. 15 and 16, a program executed in mobile phone 100 according to the present embodiment is related to a searching-side process and has a control structure as described below. It is noted that, in the processes shown in FIGS. 15 and 16, the same processes as those in FIG. 3 are denoted by the same step numbers. The processes performed thereat are also the same. Therefore, detailed description thereof will not be repeated here.

At S200, control portion 110 of mobile phone 100 performs a connection request process. Here, a common character is input that was predetermined by the user of mobile phone 100 on the searching side and the user of mobile phone 100 on the searched side. This, for example, may be a numeral such as "2."

After the process at S200, the processes at S102 to S122 described earlier in the first embodiment are performed.

After the process at S122, at S202, control portion 110 determines whether or not the common character is received. If the common character is received (YES at S202), the process goes on to S204. If not (NO at S202), the process goes on to S206.

At S204, control portion 110 stores the common character into storage portion 130 by associating the character with the device name of the transmission source.

At S206, control unit 110 determines whether or not a predetermined time has elapsed since the NameRequest command was issued. If the predetermined time has elapsed (YES at S206), the process goes on to S208 in FIG. 16. If not (NO at S206), the process goes back to S202, to wait for reception of the common character.

Referring to FIG. 16, at S208, control portion 110 searches for the common character stored in storage portion 130 that is associated with the device name.

At S210, control portion 110 makes display portion 154 to preferentially display the device name for which the same common character as that input into mobile phone 100 on the searching side is stored. Here, for instance, when the user of mobile phone 100 on the searching side enters "2" while the user of mobile phone 100 on the searched side also enters "2," to issue connection requests to each other, display portion 154 of mobile phone 100 on the searching side displays the device name of mobile phone 100 on the searched side at the top.

Figure 17:
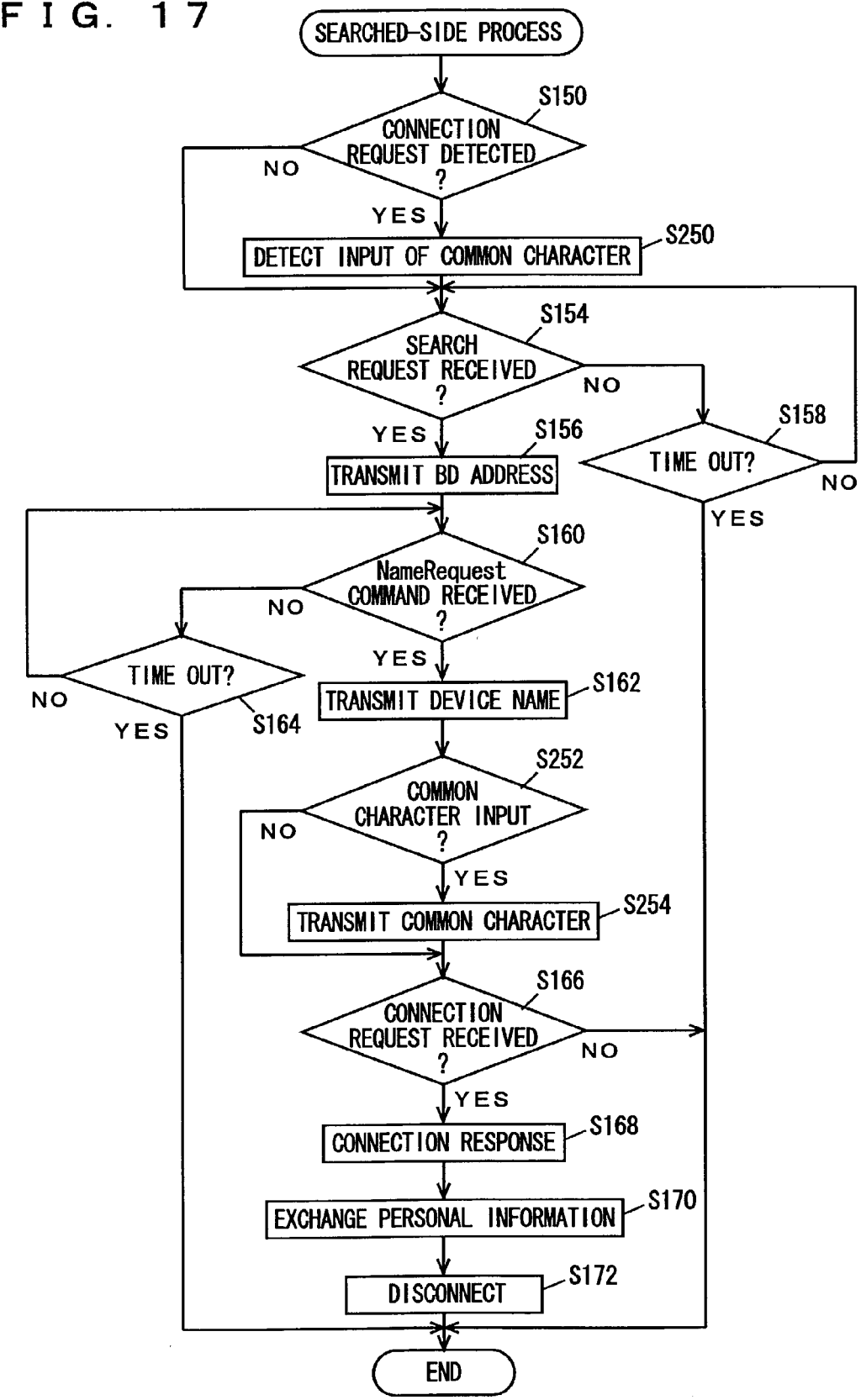
FIG. 17 is a flow chart illustrating a procedure of control in a process on the searched side executed in the mobile phone according to the second embodiment of the present invention.

Referring to FIG. 17, the program executed in mobile phone 100 according to the present embodiment is related to a searched-side process and has a control structure as described below. It is noted that, in the following processes, the same ones as those in FIG. 4 according to the first embodiment are denoted by the same step numbers. The processes performed thereat are also the same. Therefore, detailed description thereof will not be repeated here.

At S250, control portion 110 detects an input, of a common character. The common character is the same as the common character entered by the user of mobile phone 100 on the searching side at S200 in FIG. 15. Subsequently, the processes at S154 to S162 are performed.

At S252, control portion 110 determines whether or not the common character is input. If the common character is input (YES at S252), the process goes on to S254. If not (NO at S252), the process goes on to S166.

At S254, control portion 100 transmits the common character to mobile phone 100 on the searching side. Thereafter, the processes at S166 to S172 are performed to terminate the searched-side process.

The operation of mobile phone 100 according to the present embodiment based on the structure and flow charts described above will now be described with reference to FIG. 18.

The respective users of mobile phone 100 on the searching side and mobile phone 100 on the searched side press the same numeric key to issue connection requests. Mobile phone 100 on the searching side issues a search request to mobile phone 100 on the searched side (S102). Mobile phone 100 on the searched side transmits a search response including a BD address to mobile phone 100 on the searching side (S158). Mobile phone 100 on the searching side that received the BD address transmits a NameRequest to mobile phone 100 on the searched side (S112). Mobile phone 100 on the searched side that received the NameRequest transmits a NameRequest response including a device name to mobile phone 100 on the searching side.

If the common character has been entered by the user (YES at S252), mobile phone 100 on the searched side transmits the common character to mobile phone 100 on the searching side (S254). If mobile phone 100 on the searching side receives the common character (YES at S202), the common character is stored, associated with the device name of the transmission source (S204). The stored common character is searched for based on the device name (S208), and the device name for which the same common character as the input common character (S200) is stored is displayed with higher priority on display portion 154 (S210). Here, display portion 154 of mobile phone 100 on the searching side shows a screen image as shown in FIG. 19. This allows the user of mobile phone 100 on the searching side to readily identify mobile phone 100 on the searched side.

As described above, according to the mobile phone in the present embodiment, the display on the mobile phone on the searching side that shows a mobile phone of a desired communication party can be controlled based on the common character that is predetermined by the user of the mobile phone on the searching side and the user of the mobile phone on the searched side.

It is noted that, though the device name and common character are separately transmitted in the description above, it is not limited thereto. For instance, the device name may be transmitted including the common character.

Third Embodiment

Mobile phone 100 according to the present embodiment is not to control display on the mobile phone on the searching side, but to determine whether or not a connection is to be made, using an authentication code. It is noted that the hardware configuration of the mobile phone according to the present embodiment is the same as that of the mobile phone as described earlier in the first embodiment. Therefore, detailed description thereof will not be repeated here.

Figure 20:
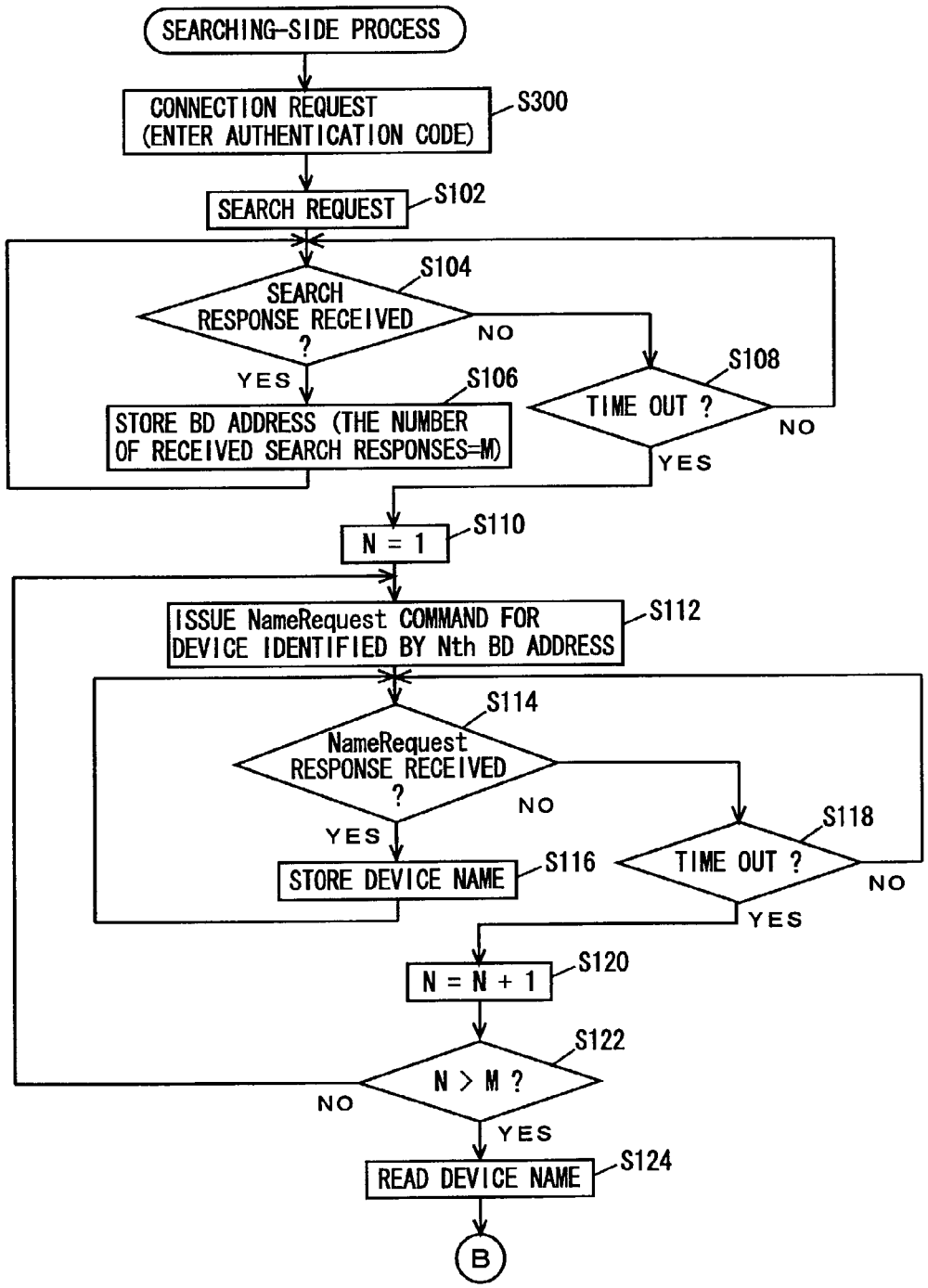
FIGS. 20 and 21 are flow charts illustrating a procedure of control in a process on the searching side executed in a mobile phone according to the third embodiment of the present invention.
Figure 21:
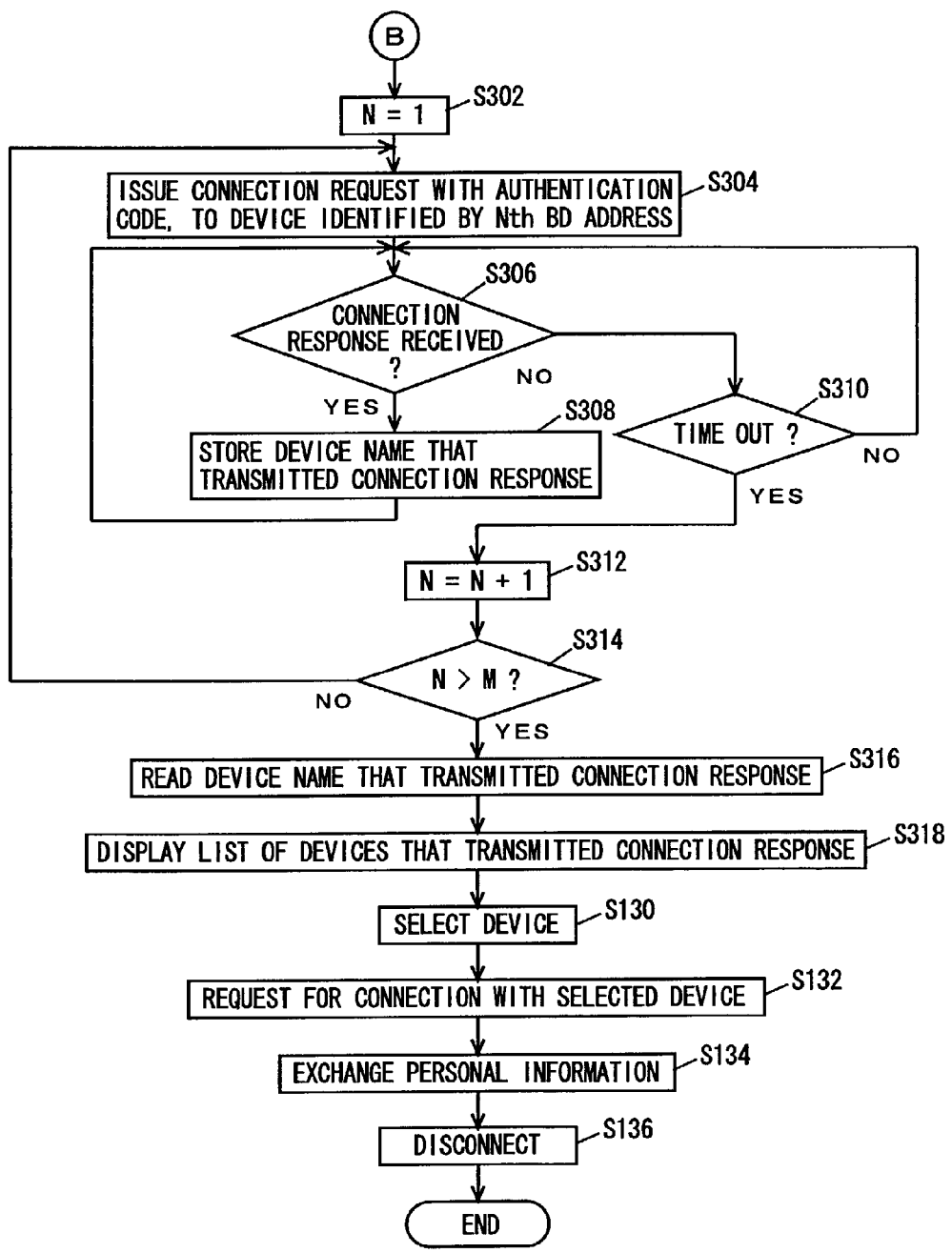

Referring to FIGS. 20 and 21, a program executed in mobile phone 100 according to the present embodiment is related to a searching-side process, and has a control structure as described below. It is noted that, in the processes shown in FIGS. 20 and 21, the same processes as those in FIG. 3 according to the first embodiment are denoted by the same step numbers. The respective processes performed thereat are also the same. Therefore, detailed description thereof will not be repeated here.

At S300, control portion 110 performs a connection request process by entering an authentication code. This process is performed by the user of mobile phone 100 on the searching side entering information indicating a connection request and the authentication code from operation portion 152.

Subsequently, the processes at S102 to S124 are performed. Referring to FIG. 21, at S302, control portion 110 initializes a variable N (N=1). At S304, control portion 110 issues a connection request with an authentication code attached, to a device identified by the Nth BD address.

At S306, control portion 110 determines whether or not a connection response is received from mobile phone 100 on the searched side. If the connection response is received (YES at S306), the process goes on to S308. If not (NO at S306), the process goes on to S310.

At S308, control portion 110 stores the device name of a device that transmitted the connection response into storage portion 130.

At S310, control portion 110 determines whether or not a predetermined time has elapsed since the connection request with authentication code was issued. If the predetermined time has elapsed YES at S310), the process goes on to S312. If not (NO at S310), the process goes back to S306, to further wait for reception of a connection response.

At S312, control portion 110 adds 1 to variable N. At S314, control portion 110 determines whether or not variable N is greater than M. If variable N is greater than M (YES at S314), the process goes on to S316. If not (NO at S312), the process goes back to S304, to perform a process for a device identified by the next BD address.

At S316, control portion 110 reads out, from storage portion 130, the device name of a device that transmitted the connection response. At S318, control portion 110 displays a list of devices that transmitted the connection response on display portion 154.

At S130, the user of mobile phone 100 on the searching side selects a device, to be connected to the selected device for exchanging personal information.

If the list of devices that transmitted the connection response shows only one mobile phone, the process at S130 subsequent to S308 may be omitted.

Figure 22:
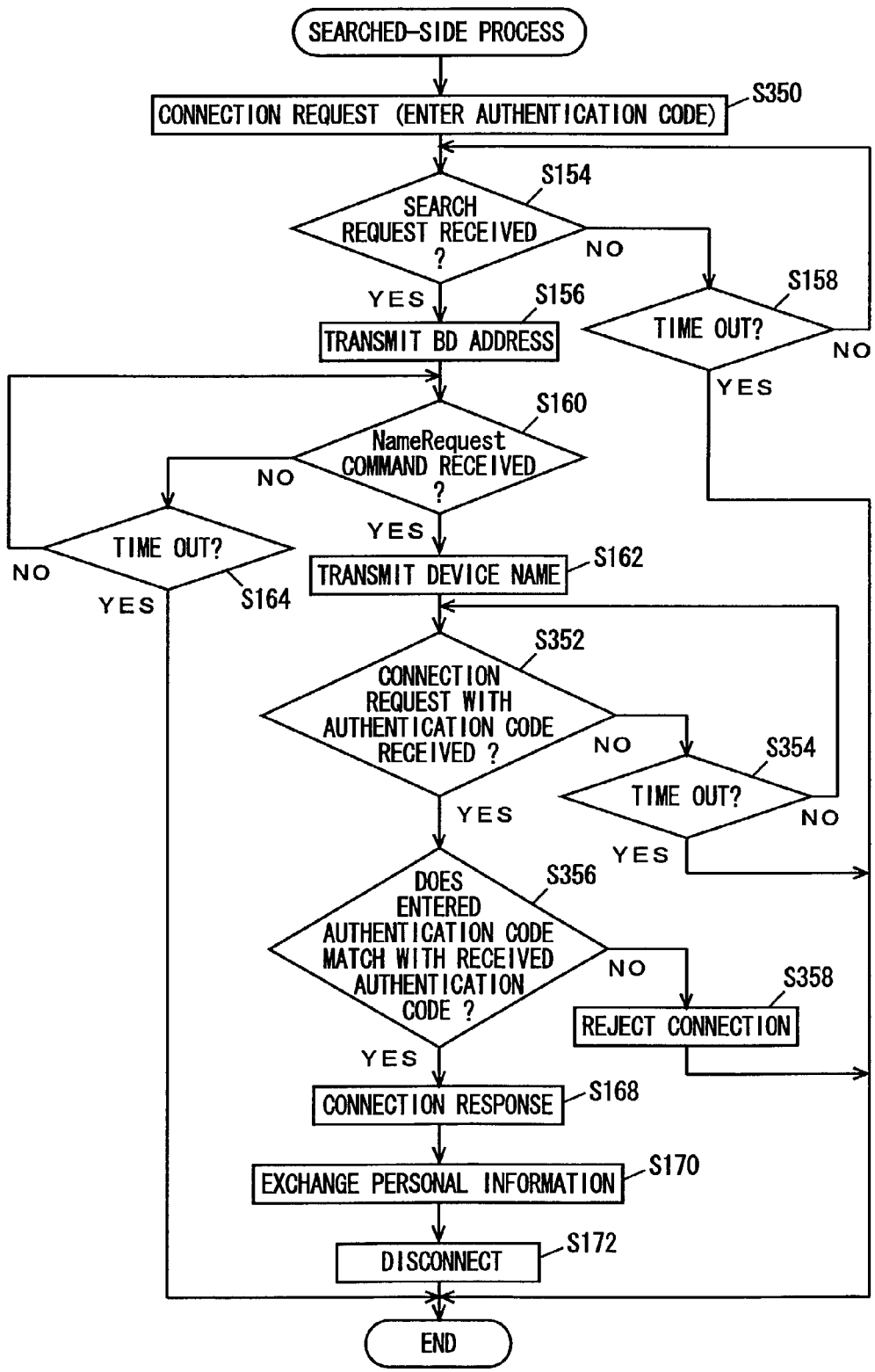
FIG. 22 is a flow chart illustrating a procedure of control in a process on the searched side executed in the mobile phone according to the third embodiment of the present invention.

Referring to FIG. 22, a program executed in mobile phone 100 according to the present embodiment is related to a searched-side process, and has a control structure as described below. It is noted that, in the processes shown in FIG. 22, the same ones as those in FIG. 4 according to the first embodiment described earlier are denoted by the same step numbers. The respective processes performed thereat are also the same. Therefore, detailed description thereof will not be repeated here.

At S350, control portion 110 detects an input of an authentication code to perform a connection request process. The authentication code input herein is the same as the authentication code used at S300 in FIG. 20. The code is predetermined by the user of mobile phone 100 on the searching side and the user of mobile phone 100 on the searched side. After the process, the processes at S154 to S164 are performed.

At S352, control portion 110 determines whether or not the connection request with an authentication code is received. If the connection request with authentication code is received from mobile phone 100 on the searching side (YES at S352), the process goes on to S356. If not (NO at S352), the process goes on to S354. At S354, control portion 110 determines whether or not a predetermined time has elapsed since the device name was transmitted. If the predetermined time has elapsed (YES at S354), the searched-side process is terminated. If not (NO at S354), the process goes back to S352, to wait for reception of the connection request with an authentication code attached.

At S356, control portion 110 determines whether or not the authentication code entered at S350 matches with the authentication code received at S352. If the authentication codes match (YES at S356), the process goes on to S168. If not (NO at S356), the process goes on to S358. At S358, control portion 110 performs a process of rejecting connection. It is noted that, if the authentication codes match (YES at S356), the processes at S168 to S172 described in the first embodiment are performed.

Figure 23:
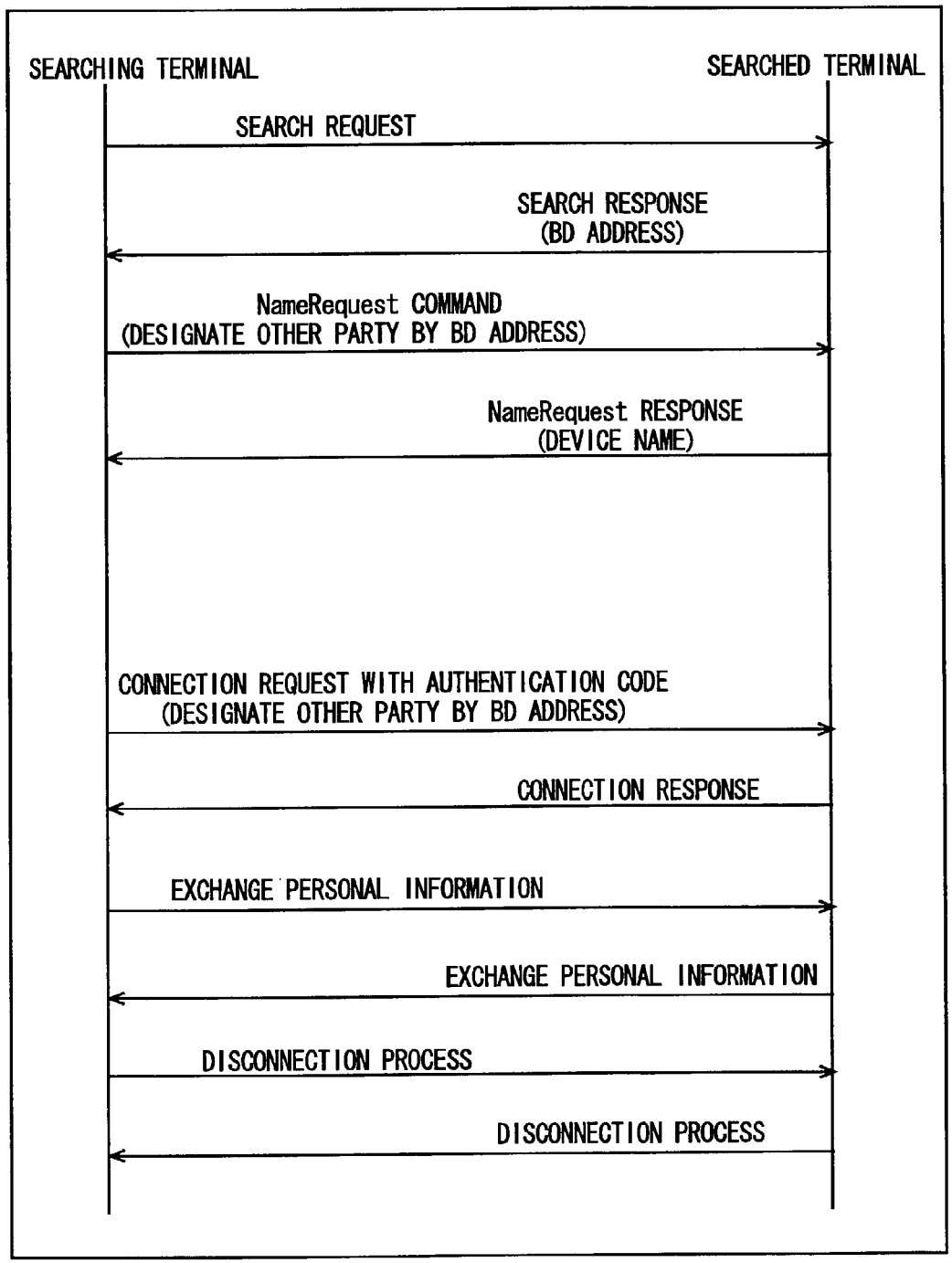
FIG. 23 is a state transition view of a communication system according to the third embodiment of the present invention.

The operation of mobile phone 100 according to the present embodiment based on the structure and flow charts described above will now be described with reference to FIG. 23.

Figure 24:
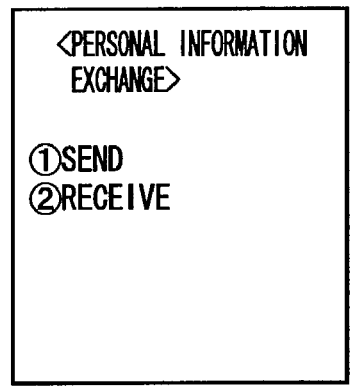
Figure 30:
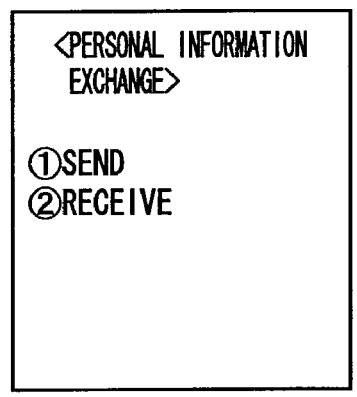

The authentication code is set by the user of mobile phone 100 on the searching side and the user of mobile phone 100 on the searched side. A connection request and an authentication code are input into mobile phone 100 on the searching side (S300), while a connection request and an authentication code are input into mobile phone 100 on the searched side (S350). The screen image displayed on screen portion 154 of mobile phone 100 on the searching side is shown in FIG. 24, whereas that displayed on display portion 154 of mobile phone 100 on the searched side is shown in FIG. 30.

Figure 25:
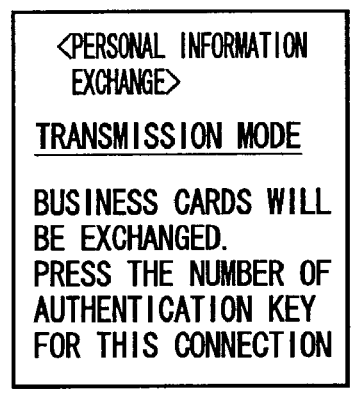
Figure 26:
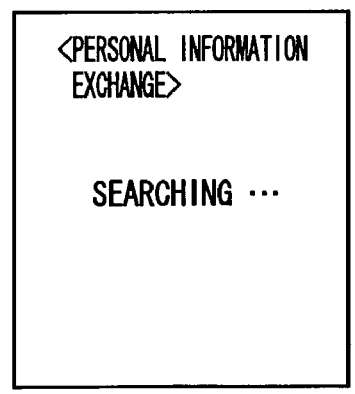
Figure 31:
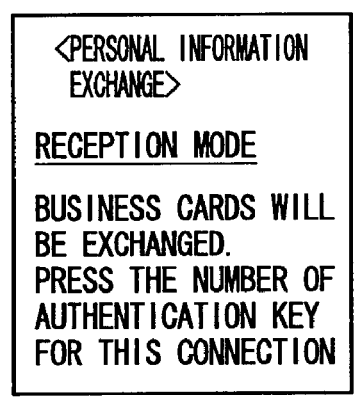
Figure 32:
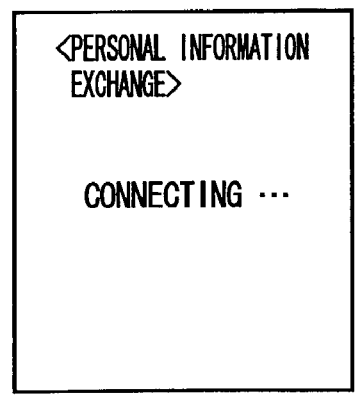

FIG. 25 shows a screen requesting for an authentication code displayed on display unit 154 of mobile phone 100 on the searching side. FIG. 31 shows a screen requesting for an authentication code, displayed on display unit 154 of mobile phone 100 on the searched side. In the search request and search response, and in the NameRequest command transmission and the NameRequest response, display portion 154 of mobile phone 100 on the searching side displays a screen image shown in FIG. 26, and display portion 154 of mobile phone 100 on the searched side displays a screen image shown in FIG. 32.

The connection request with authentication code is transmitted from mobile phone 100 on the searching side to mobile phone 100 on the searched side (S304). At mobile phone 100 on the searched side, it is determined whether or not the pre-input authentication code matches with the received authentication code (S356). If the input authentication code matches with the received authentication code (YES at S356), a connection response is transmitted from mobile phone 100 on the searched side to mobile phone 100 on the searching side (S168).

Figure 27:
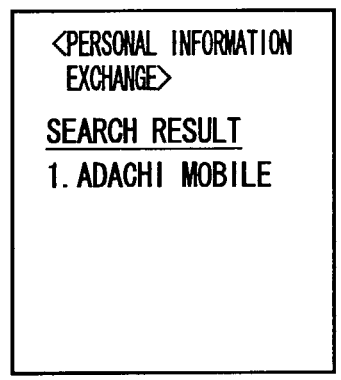
Figure 28:
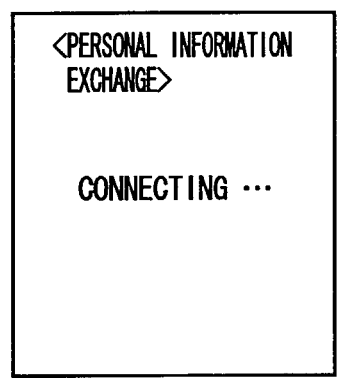

A list of devices that transmitted the connection response is displayed on display portion 154 of mobile phone 100 on the searching side (S318), as shown in FIG. 27. The user of mobile phone 100 on the searching side selects a device (S130). The process of connecting to the selected device is performed (S132). Here, display portion 154 of mobile phone 100 on the searching side displays a screen image shown in FIG. 28. Display portion 154 of mobile phone 100 on the searched side that received a request for exchanging personal information from mobile phone 100 on the searching side displays a screen image shown in FIG. 33.

Figure 29:
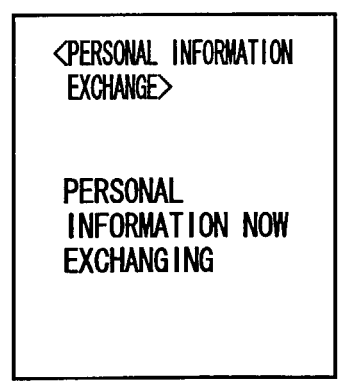

When personal information are exchanged (S134, S170), display portion 154 of mobile phone 100 on the searching side displays a screen shown in FIG. 29, while display portion 154 of mobile phone 100 on the searched side displays a screen shown in FIG. 34.

As described above, the mobile phone according to the present embodiment can select one mobile phone from a plurality of mobile phones present within a communication coverage, using an authentication code predetermined by the user of the mobile phone on the searching side and the user of the mobile phone on the searched side. Personal information can be exchanged with the selected mobile phones.

Fourth Embodiment

According to the present embodiment, a plurality of mobile phones are grouped as one category, and personal information are exchanged between a plurality of mobile phones in different categories. It is noted that the hardware of the mobile phone according to the present embodiment is the same as that of mobile phone 100 in the first embodiment described earlier. Therefore, detailed description thereof will not be repeated here.

Figure 35:
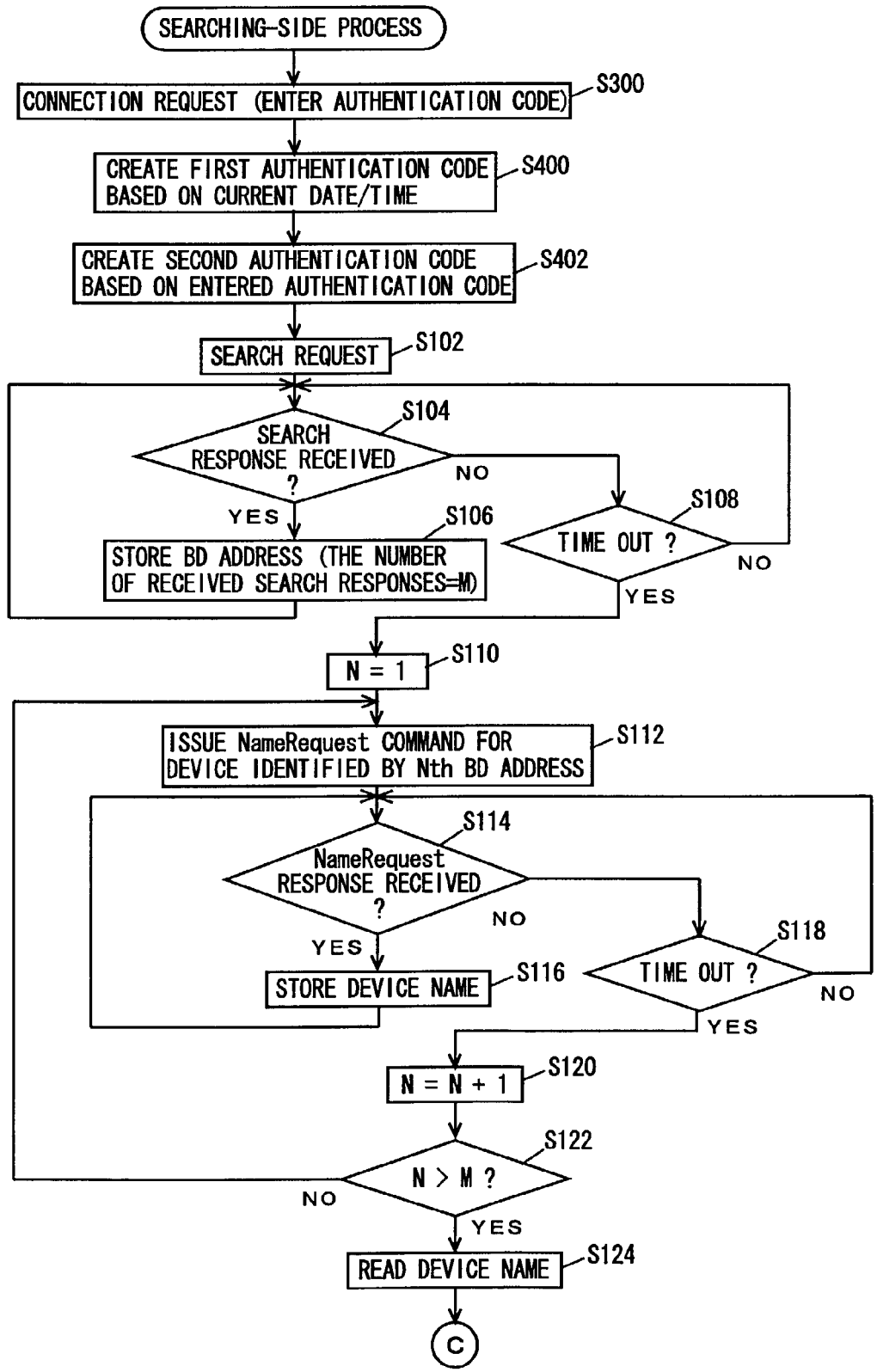
FIGS. 35 and 36 are flow charts illustrating the procedure of control in a process on the searching side executed by a mobile phone according to the fourth embodiment of the present invention.
Figure 36:
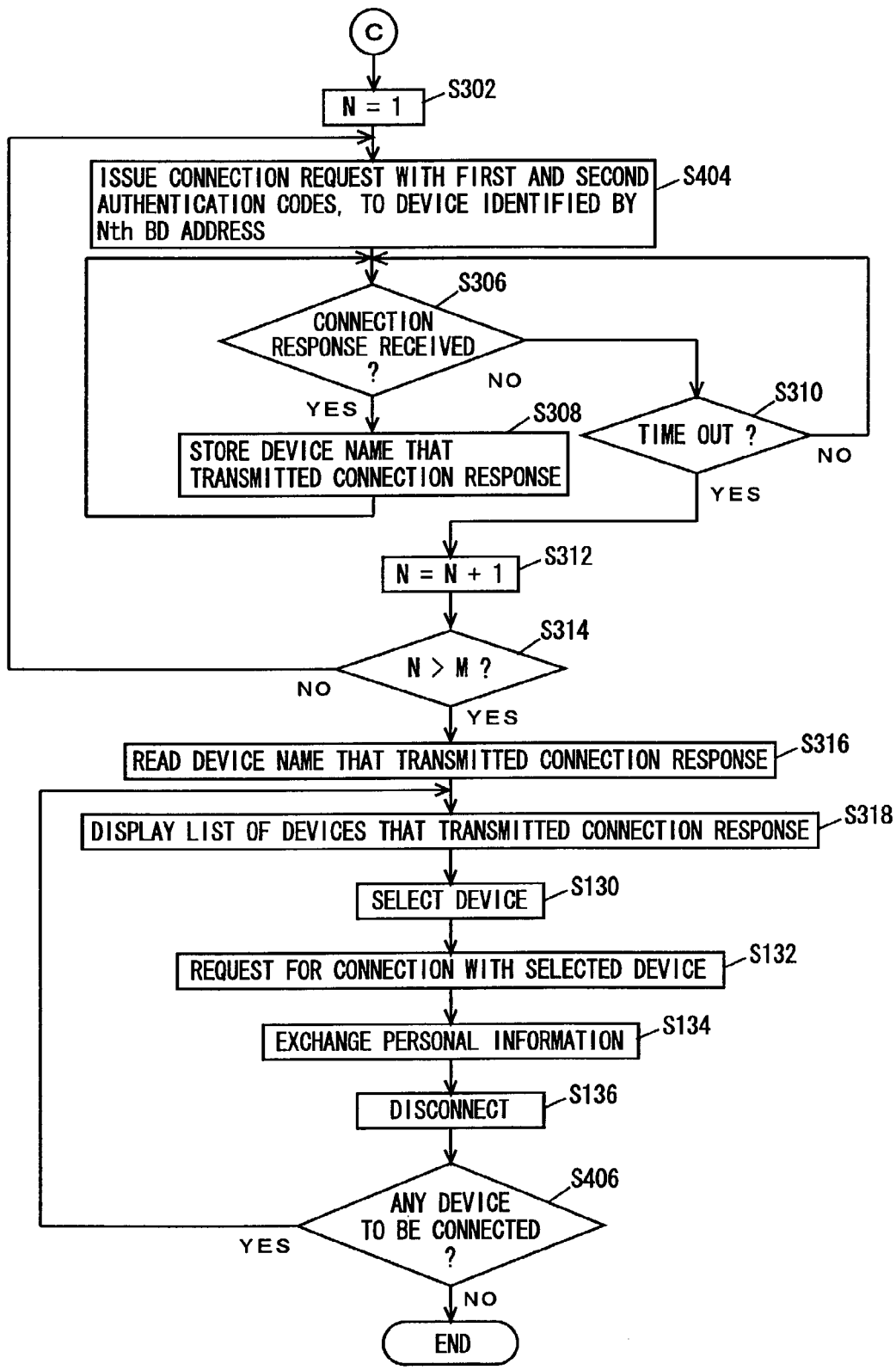

Referring to FIGS. 35 and 36, a program executed in mobile phone 100 according to the present embodiment is related to a searching-side process, and has a control structure as follows. It is noted that, in the processes shown in FIGS. 35 and 36, the same ones as those in FIGS. 20 and 21 in the third embodiment are denoted by the same step numbers. The respective processes performed thereat are also the same. Therefore, detailed description thereof will not be repeated here.

At S300, control portion 110 of mobile phone 100 performs a connection request process. The connection request process is performed by the users of mobile phones 100 that belong to the same category entering the same authentication code. For instance, assuming that business cards are exchanged between the users who belong to two different companies. Here, the users who belong to the same company do not need to exchange business cards. The users who belong to different companies, however, need to exchange cards. The process for the mobile phone according to the present embodiment is applied to such a case. The users who belong to the same company enter the same authentication code.

At S400, control portion 110 creates the first authentication code based on the current date and time. If, for example, the current date/time is Jul. 3, 2001, 3:15 p.m., "200107031515" is created as the first authentication code. At S402, control portion 110 creates the second authentication code based on the input authentication code. Subsequently, the processes at S102 to S124 are performed.

Referring to FIG. 36, at S302, control portion 110 initializes a variable N (N=1). At S404, control portion 110 performs a connection request process with the first and second authentication code attached, to a device identified by the Nth BD address. Thereafter, the processes at S306 to S318 and at S130 to S316 are performed. After the disconnection process at S316, at S406, control portion 110 determines whether or not there still is another party to be connected. If there is another party to be connected (YES at S406), the process goes back to S318, to further exchange personal information with the next device. If not (NO at S406), the searching-side process is terminated.

Figure 37:
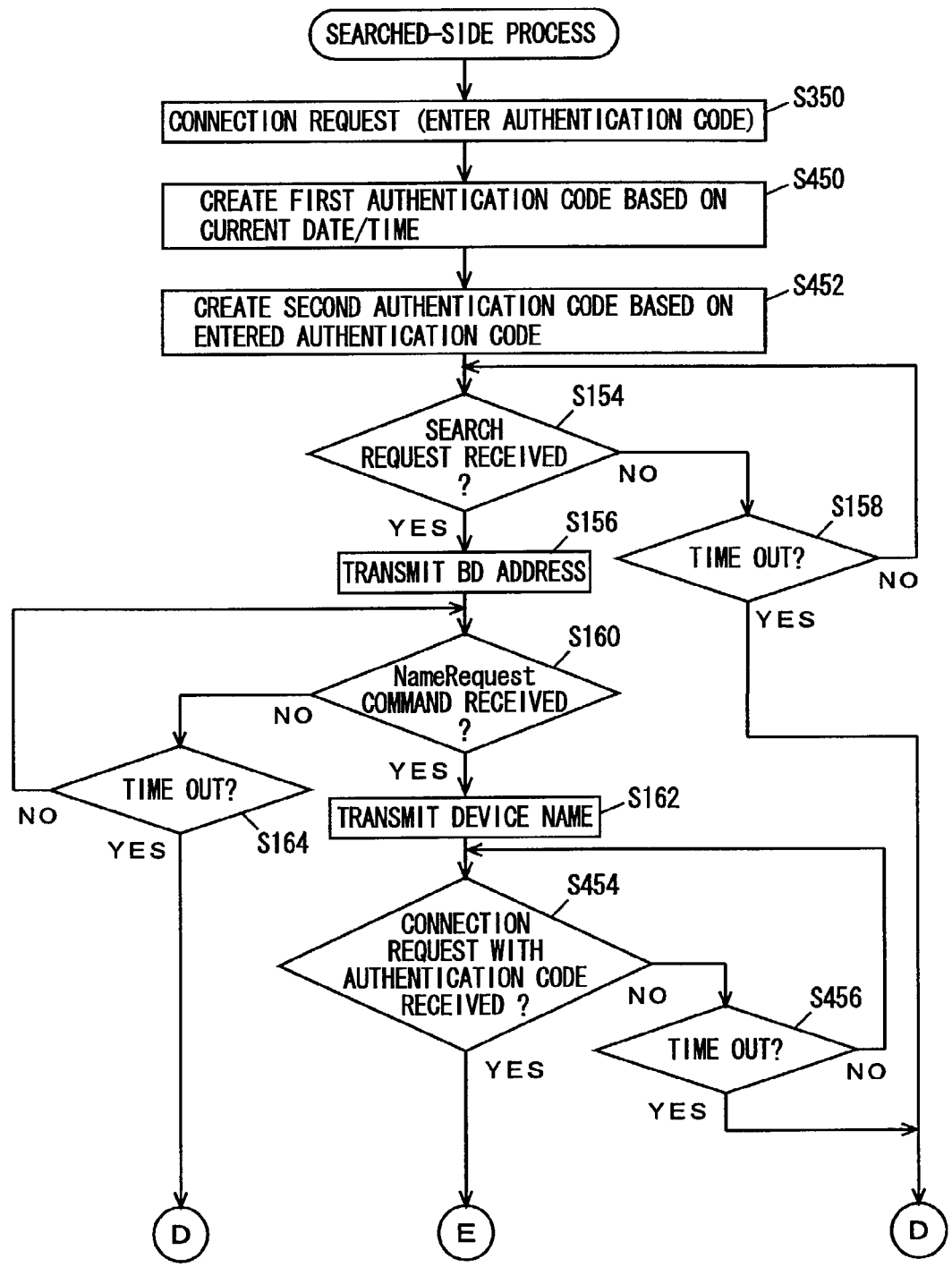
FIGS. 37 and 38 are flow charts illustrating the procedure of control in a process on the searched side executed in the mobile phone according to the fourth embodiment of the present invention.
Figure 38:
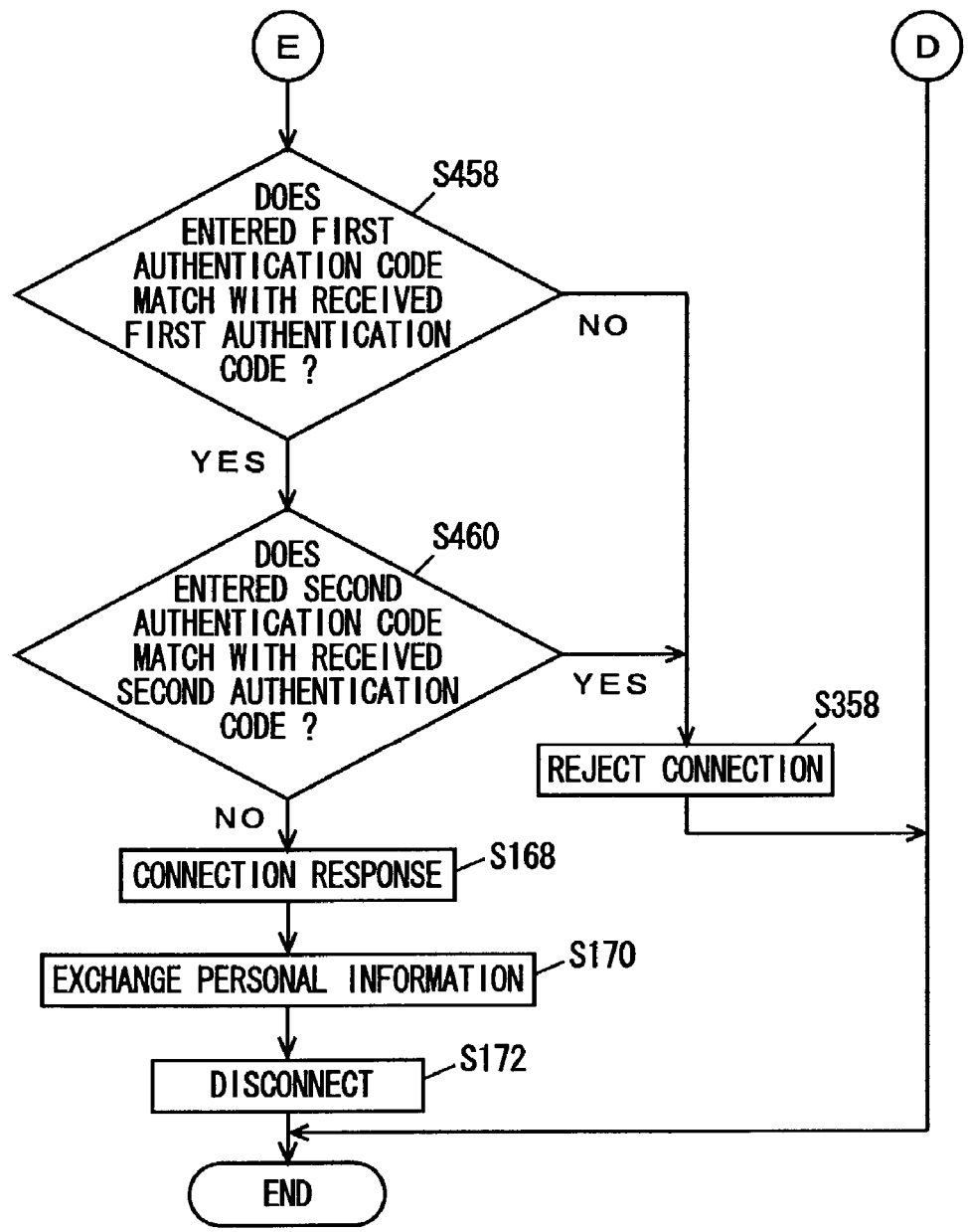

Referring to FIGS. 37 and 38, mobile phone 100 according to the present embodiment is related to a searched-side process and has a control structure as follows. It is noted that, in the processes shown in FIGS. 37 and 38, the same ones as those shown in FIG. 22 are denoted by the same step numbers. The respective processes performed thereat are also the same. Therefore, detailed description thereof will not be repeated here.

At S350, control portion 110 performs a connection request process based on an authentication code input into mobile phone 100. The authentication code input at S350 is the same as the authentication code input at S300 in FIG. 35. Moreover, the processes at S300 and at S350 are performed at the same time. For instance, the user of mobile phone 100 on the searching side and the user of mobile phone 100 on the searched side enter authentication codes in one room according to a signal. If it is assumed that a plurality of users between two companies exchange business cards as described earlier, the users who belong to the same company enter the same authentication code.

At S450, control portion 110 creates the first authentication code based on the current date and time. The process at S450 corresponds to the process at S400 in FIG. 35.

At S452, control portion 110 creates the second authentication code based on the input authentication code. The process at S452 corresponds to the process at S402 in FIG. 35. Subsequently, the processes at S154 to S162 are performed.

At S454, control portion 110 determines whether or not a connection request with an authentication code is received. The authentication code to be received here includes the first authentication code and the second authentication code. If the connection request with authentication code is received (S at S454), the process goes on to S458 in FIG. 38. If not (NO at S454), the process goes on to S456.

At S456, control portion 110 determines whether or not a predetermined time has elapsed since the transmission of the device name at S162. If the predetermined time has elapsed (YES at S456), the searched-side process is terminated. If not (NO at S456), the process goes back to S454, to wait for reception of the connection request with authentication code.

Referring to FIG. 38, at S458, control portion 110 determines whether or not the input first authentication code matches with the received first authentication code. Here, the first authentication code is determined as matched if it is within a predetermined range. For instance, if the first authentication code is "200107031515" as described earlier, the authentication code is determined as matched even if the first authentication code is actually slightly different such as "200107031514" or "200107031516." This is because the time differences for the entering process arise due to individual differences, even if the users simultaneously press the connection request. If the first authentication codes match (YES at S458), the process goes on to S460. If not (NO at S458), the process goes on to S358.

At S460, control portion 110 determines whether or not the input second authentication code matches with the received second authentication code. If the second authentication codes match with each other (YES at S460), the process goes on to S358. If not (NO at S460), the process goes on to S168.

Figure 39:
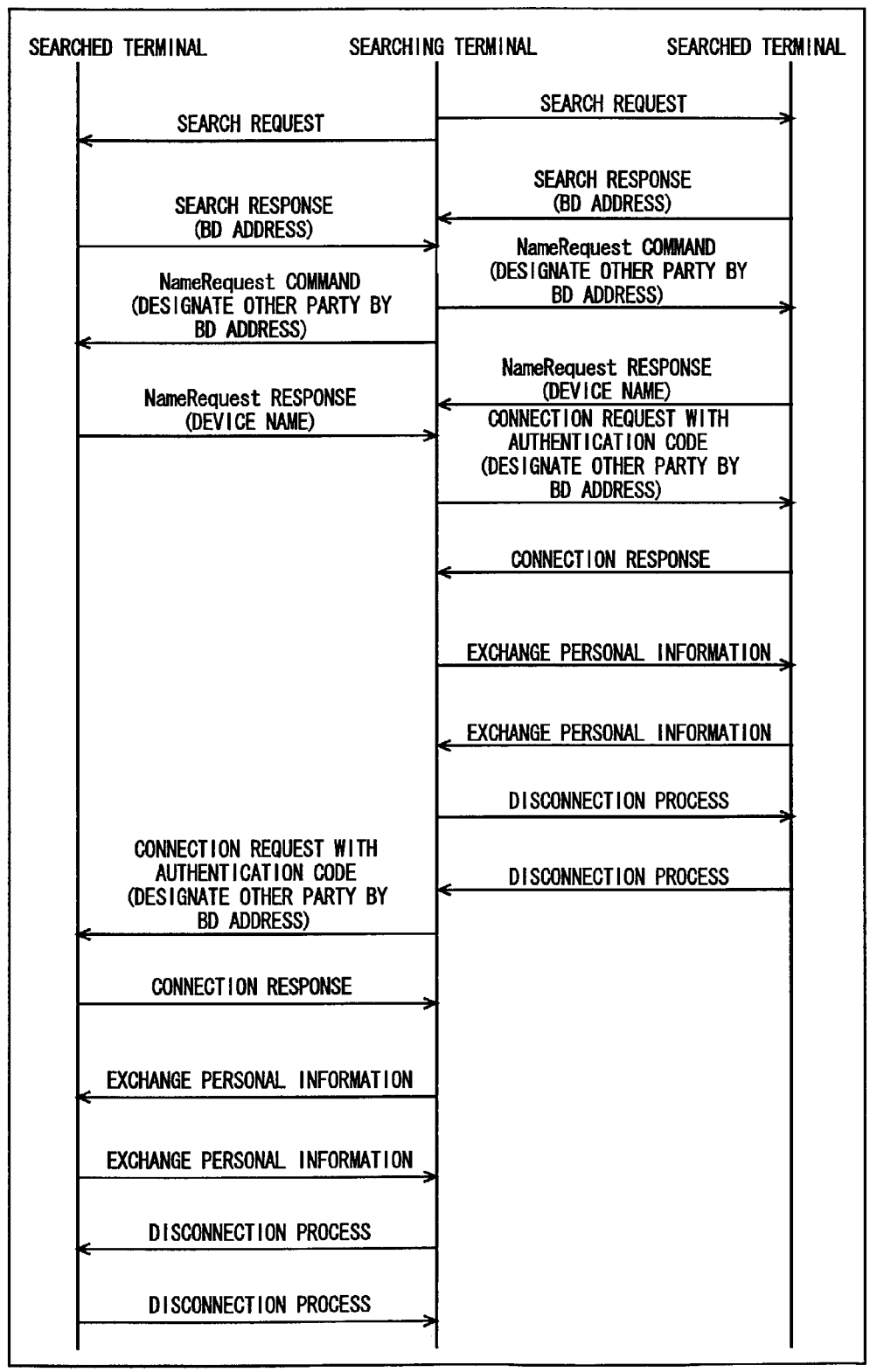
FIG. 39 is a state transition view of a communication system according to the fourth embodiment of the present invention.

At S168, control portion 110 performs a connection response to mobile phone 100 on the searching side. Thus, in the present embodiment, the connection response is transmitted under the condition that the first authentication codes match with each other and that the second authentication codes do not match with each other. This is based on that, when a plurality of persons in two different companies exchange business cards, persons in the same company do not need to exchange the cards. The operation of mobile phone 100 according to the present embodiment based on the structure and flow charts described above will now be described with reference to FIG. 39.

Assuming that mobile phone 100 on the searching side exchanges personal information with two mobile phones 100 on a searched side of the users who belong to a company different from the user of mobile phone 100 on the searching side.

Figure 40:
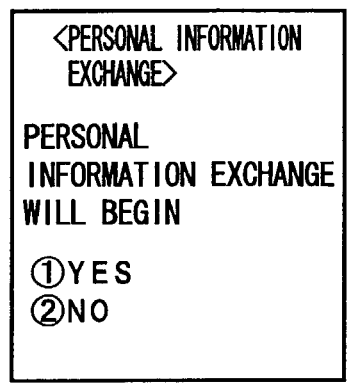
Figure 41:
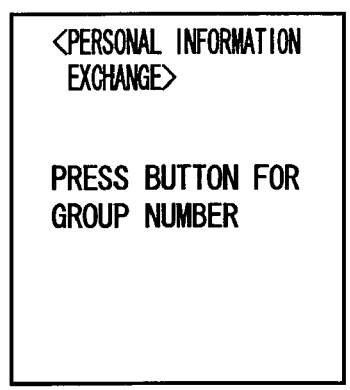

Each display portion 154 of mobile phone 100 on the searching side and mobile phone 100 on the searched side displays a screen image shown in FIG. 40. When a request is issued for exchange of personal information, a screen image requesting for an input of a group number is displayed, as shown in FIG. 41. A plurality of users who wish to exchange personal information simultaneously enter an authentication code predetermined for each group into mobile phone 100, according to the screen image shown in FIG. 41 (S300, S350).

The first authentication codes are created respectively based on the input date and time (S400, S450), and the second authentication codes are created based on the input authentication code (S402, S452). Thereafter, the searching-side process and the NameRequest process are performed. A connection response process is performed based on the first and second authentication codes. Here, mobile phone 100 on the searched side performs connection response only when the first authentication codes match with each other and the second authentication codes do not match with each other (YES at S458, NO at S460, S168).

Figure 42:
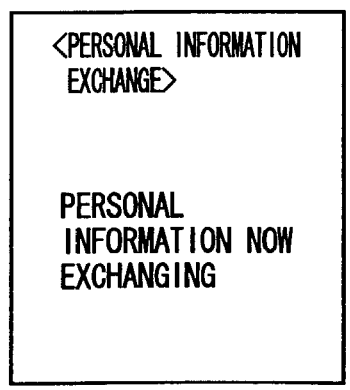

Thus, a mobile phone of a communication party for exchanging cards is specified, a device is selected by the user of mobile phone 100 on the searching side (S130), connection is made with the selected device (S132), and personal information are exchanged (S134, S170). If the exchange of personal information with one device is terminated, a disconnection process is performed (S136, S172), and if there is another device to be connected (YES at S146), personal information is further exchanged with the next device. When personal information are exchanged, a screen image shown in FIG. 42 is displayed on display portion 154. Moreover, if the exchange of personal information is terminated, a screen image shown in FIG. 43 is displayed.

As described above, according to a mobile phone in the present embodiment, personal information can be exchanged only with a person having a mobile phone determined according to a predetermined rule. Furthermore, a plurality of mobile phones 100 can exchange personal information with one another.

A modification common to the four embodiments above will be described below. Though it was described that the input information (e.g. a common character, the first authentication code and second authentication code) in the above-described embodiments are input by the user from the operation portion of a mobile phone, it is not limited thereto. Such input information may also be, for example, sound information input from a sound input portion of a mobile phone, not from an operation portion. In such a case, the input sound information is regarded as a "password", and the common character, the first authentication code and the second authentication code are created based on the sound information. Moreover, a mobile phone may be provided with an image shooting portion. Other than the sound information, the input information above may also be an image information showing the user shot by the image shooting portion,. The mobile phone may further be provided with a fingerprint identification portion, and the input information may be user information identified by the fingerprint identification portion. The mobile phone may be provided with a GPS (Global Positioning System) for specifying a position. The input information may also be positional information of the mobile phone determined by the GPS. Moreover, the short-range wireless device may be provided with an identification portion for identifying the magnitude of received electric wave. The input information above may also be relative positional information of mobile phones determined by the identification portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication system effecting communication between a first terminal and a second terminal, said first terminal including
a storage circuit to store first information for said second terminal to identify said first terminal and second information for a user of said second terminal to identify said first terminal,
a detection circuit to detect an instruction for connection with said second terminal, and
a transmission circuit connected to said storage circuit and said detection circuit, to transmit said first information and said second information to said second terminal in response to said instruction,
said second terminal including
a reception circuit to receive said first information and said second information from said first terminal,
a determination circuit connected to said reception circuit, to determine a manner in which the user of said second terminal recognizes said second information, based on said second information,
a display circuit to display said second information of said first terminal, and
a control circuit connected to said determination circuit and said display circuit, to control said display circuit such that said second information is displayed in said determined manner.

2. A communication system effecting communication between a first terminal and a second terminal,
said first terminal including
a storage circuit to store first information for said second terminal to identify said first terminal and second information for a user of said second terminal to identify said first terminal,
a transmission circuit connected to said storage circuit, to transmit said first information and said second information to said second terminal,
a detection circuit to detect an instruction for connection with said second terminal, and
an instruction transmission circuit connected to said detection circuit, to create third information and to transmit said third information to said second terminal in response to said instruction,
said second terminal including
a reception circuit to receive said first information, said second information and said third information from said first terminal,
a display circuit to display second information of said first terminal, and
a control circuit connected to said display circuit, to control said display circuit such that said second information is displayed in a manner for the user of said second terminal to recognize said second information more readily when said third information is received, compared to when said third information is not received.

3. A communication system effecting communication between a first terminal and a second terminal,
said first terminal including
a storage circuit to store information for said second terminal to identify said first terminal,
a transmission circuit connected to said storage circuit, to transmit said information to said second terminal, and
a creation circuit to create a first code indicating permission for connection with said second terminal,
said second terminal including
a reception circuit to receive said information from said first terminal,
a creation circuit to create a second code indicating permission for connection with said first terminal,
a command transmission circuit connected to said creation circuit, to transmit a connection request command to said first terminal based on said information,
a code transmission circuit to transmit said second code to said first terminal based on said information,
a determination circuit connected to said reception circuit, to determine a manner in which the user of said second terminal recognizes said information,
a display circuit to display said information, and
a control circuit connected to said determination circuit and said display circuit, to control said display circuit such that said information is displayed in said determined manner,
said first terminal further including
a command reception circuit to receive said connection request command and said second code from said second terminal,
a determination circuit connected to said command reception circuit, to determine whether or not connection is to be made with said second terminal, based on said first code and said second code, and
a response command transmission circuit connected to said determination circuit, to transmit a connection response command to said second terminal, based on a result determined by said determination circuit.

4. A first terminal in a communication system effecting communication between said first terminal and a second terminal,
said second terminal receiving, from said first terminal, first information for said second terminal to identify said first terminal and second information for a user of said second terminal to identify said first terminal, determining a manner in which the user of said second terminal recognizes said second information, based on said second information, and displaying said second information in the manner,
said first terminal including
a storage circuit to store said first information and said second information,
a detection circuit to detect an instruction for connection with said second terminal, and
a transmission circuit connected to said storage circuit and said detection circuit, to transmit said first information and said second information to said second terminal in response to said instruction.

5. A first terminal in a communication system effecting communication between said first terminal and a second terminal,
said second terminal receiving, from said first terminal, first information for said second terminal to identify said first terminal, second information for a user of said second terminal to identify said first terminal and third information, and displaying said second information for the user of said second terminal to recognize said second information more readily when said third information is received, compared to when said third information is not received,
said first terminal including
a storage circuit to store said first information and said second information,
a transmission circuit connected to said storage circuit, to transmit said first information and said second information to said second terminal,
a detection circuit to detect an instruction for connection with said second terminal, and
an instruction transmission circuit connected to said detection circuit, to create said third information and to transmit said third information to said second terminal, in response to said instruction.

6. A first terminal in a communication system effecting communication between said first terminal and a second terminal,
said first terminal including
a storage circuit to store information for said second terminal to identify said first terminal,
a transmission circuit connected to said storage circuit, to transmit said information to said second terminal, and
a creation circuit to create a first code indicating permission for connection with said second terminal,
said second terminal receiving said information from said first terminal, creating a second code indicating permission for connection with said first terminal, transmitting a connection request command and said second code to said first terminal based on said information,
determining a manner in which the user of said second terminal recognizes said information, displaying said information by a display circuit, and controlling said display circuit such that said information is displayed in said determined manner,
said first terminal further including
a command reception circuit to receive said connection request command and said second code from said second terminal,
a determination circuit connected to said command reception circuit, to determine whether or not connection is to be made with said second terminal, based on said first code and said second code, and
a response command transmission circuit connected to said determination circuit, to transmit a connection response command to said second terminal based on a result determined by said determination circuit.

7. The terminal according to claim 6, further comprising a circuit to transmit a transmission request command requesting for transmission of said second code to said second terminal,
said second terminal transmitting said second code to said first terminal in response to the transmission request command received from said first terminal.

8. The terminal according to claim 6 or 7, wherein said code is created based on data indicating date and time at which an instruction is given for creation of said code.

9. The terminal according to claim 6 or 7, wherein
said code includes first data based on date and time at which an instruction is given for creation of said code and second data identifying terminals that belong to a same category according to a predetermined rule, and
said determination circuit includes a circuit to determine whether or not connection is to be made with said second terminal, based on said first data and said second data.

10. A second terminal in a communication system effecting communication between a first terminal and said second terminal,
said first terminal storing first information for said second terminal to identify said first terminal and second information for a user of said second terminal to identify said first terminal, and transmitting said first information and said second information to said second terminal when an instruction for connection with said second terminal is detected,
said second terminal including
a reception circuit to receive said first information and said second information from said first terminal,
a determination circuit connected to said reception circuit, to determine a manner in which the user of said second terminal recognizes said second information, based on said second information,
a display circuit to display said second information of said first terminal, and
a control circuit connected to said determination circuit and said display circuit, to control said display circuit such that said second information is displayed in said determined manner.

11. A second terminal in a communication system effecting communication between a first terminal and said second terminal,
said first terminal storing first information for said second terminal to identify said first terminal and second information for a user of said second terminal to identify said first terminal, transmitting said first information and said second information to said second terminal, and transmitting third information to said second terminal in response to an instruction for connection with said second terminal,
said second terminal including
a reception circuit to receive said first information, said second information and said third information from said first terminal,
a display circuit to display said second information of said first terminal, and
a control circuit connected to said display circuit, to control said display circuit such that said second information is displayed in a manner for the user of said second terminal to recognize said second information more readily when said third information is received, compared to when said third information is not received.

12. The terminal according to claim 10 or 11, further comprising:
an input circuit to input data specifying a first terminal to be connected with said second terminal, determined by the user of said second terminal based on said second information displayed on said display circuit; and
a command transmission circuit connected to said input circuit, to transmit a connection request command to said first terminal based on first information of a first terminal specified by said data.

13. A second terminal in a communication system effecting communication between a first terminal and said second terminal,
said first terminal transmitting information for said second terminal to identify said first terminal, to said second terminal, creating a first code indicating permission for connection with said second terminal, and determining whether or not connection is to be made with said second terminal based on a second code received from said second terminal and said first code,
said second terminal including
a reception circuit to receive said information from said first terminal,
a creation circuit to create a second code indicating permission for connection with said first terminal,
a command transmission circuit connected to said creation circuit, to transmit a connection request command to said first terminal based on said information,
a code transmission circuit to transmit said second code to said first terminal based on said information,
a determination circuit connected to said reception circuit, to determine a manner in which the user of said second terminal recognizes said information, a display circuit to display said information, and a control circuit connected to said determination circuit and said display circuit, to control said display circuit such that said information is displayed in said determined manner.

14. The terminal according to claim 13, further comprising a circuit to transmit said second code to said first terminal in response to said transmission request command received from said first terminal, said first terminal transmitting, to said second terminal, a transmission request command requesting for transmission of said second code.

15. The terminal according to claim 13 or 14, wherein said code is created based on data indicating date and time at which an instruction is given for creation of said code.

16. A communication system effecting communication between a first terminal and a second terminal, said first terminal including a storage means for storing first information for said second terminal to identify said first terminal and second information for a user of said second terminal to identify said first terminal, a detection means for detecting an instruction for connection with said second terminal, and a transmission means connected to said storage means and said detection means, for transmitting said first information and said second information to said second terminal in response to said instruction, said second terminal including a reception means for receiving said first information and said second information from said first terminal, a determination means connected to said reception means, for determining a manner in which a user of said second terminal recognizes said second information, based on said second information, a display means for displaying said second information of said first terminal, and a control means connected to said determination means and said display means, for controlling said display means such that said second information is displayed in said determined manner.

17. A communication system effecting communication between a first terminal and a second terminal, said first terminal including a storage means for storing first information for said second terminal to identify said first terminal and second information for a user of said second terminal to identify said first terminal, a transmission means connected to said storage means, for transmitting said first information and said second information to said second terminal, a detection means for detecting an instruction for connection with said second terminal, and an instruction transmission means connected to said detection means, for creating said third information and transmitting said third information to said second terminal in response to said instruction, said second terminal including a reception means for receiving said first information, said second information and said third information from said first terminal, a display means for displaying said second information of said first terminal, and a control means connected to said display means, for controlling said display means such that said second information is displayed in a manner for a user of said second terminal to recognize said second information more readily when said third information is received, compared to when said third information is not received.

18. A communication system effecting communication between a first terminal and a second terminal, said first terminal including a storage means for storing information for said second terminal to identify said first terminal, a transmission means connected to said storage means, for transmitting said information to said second terminal, and a creation means for creating a first code indicating permission for connection with said second terminal, said second terminal including a reception means for receiving said information from said first terminal, a creation means for creating a second code indicating permission for connection with said first terminal, a command transmission means connected to said creation means, for transmitting a connection request command to said first terminal based on said information, a code transmission means for transmitting said second code to said first terminal based on said information, a determination means connected to said reception means, for determining a manner in which the user of said second terminal recognizes said information, a display means for displaying said information, and a control means connected to said determination means and said display means, for controlling said display means such that said information is displayed in said determined manner, said first terminal further including a command reception means for receiving said connection request command and said second code from said second terminal, a determination means connected to said command reception means, for determining whether or not connection is to be made with said second terminal, based on said first code and said second code, and a response command transmission means connected to said determination means, for transmitting a connection response command to said second terminal, based on a result determined by said determination means.

19. A first terminal in a communication system effecting communication between said first terminal and a second terminal, said second terminal receiving first information for said second terminal to identify said first terminal and second information for a user of said second terminal to identify said first terminal, determining a manner in which the user of said second terminal recognizes said second information, based on said second information, and displaying said second information in the manner, said first terminal including a storage means for storing said first information and said second information, a detection means for detecting an instruction for connection with said second terminal, and a transmission means connected to said storage means and said detection means, for transmitting said first information and said second information to said second terminal in response to said instruction.

20. A first terminal in a communication system effecting communication between a first terminal and a second terminal, said second terminal receiving, from said first terminal, first information for said second terminal to identify said first terminal, second information for a user of said second terminal to identify said first terminal and third information, and displaying the information for the user of said second terminal to recognize said second information more readily when said third information is received, compared to when said third information is not received, said first terminal including a storage means for storing said first information and said second information, a transmission means connected to said storage means, for transmitting said first information and said second information to said second terminal, a detection means for detecting an instruction for connection with said second terminal, and an instruction transmission means connected to said detection means, for creating said third information and transmitting said third information to said second terminal, in response to said instruction.

21. A first terminal in a communication system effecting communication between said first terminal and a second terminal, said first terminal including a storage means for storing information for said second terminal to identify said first terminal, a transmission means connected to said storage means, for transmitting said information to said second terminal, and a creation means for creating a first code indicating permission for connection with said second terminal, said second terminal receiving said information from said first terminal, creating a second code indicating permission for connection with said first terminal, transmitting a connection request command and said second code to said first terminal based on said information, determining a manner in which the user of said second terminal recognizes said information, displaying said information by a display circuit, and controlling said display circuit such that said information is displayed in said determined manner, said first terminal further including a command reception means for receiving said connection request command and said second code from said second terminal, a determination means connected to said command reception means, for determining whether or not connection is to be made with said second terminal, based on said first code and said second code, and a response command transmission means connected to said determination means, for transmitting a connection response command to said second terminal, based on a result determined by said determination means.

22. The terminal according to claim 21, further comprising a means for transmitting a transmission request command requesting for transmission of said second code to said second terminal, said second terminal transmitting said second code to said first terminal in response to the transmission request command received from said first terminal.

23. The terminal according to claim 21 or 22, wherein said code is created based on data indicating date and time at which an instruction is given for creation of said code.

24. The terminal according to claim 21 or 22, wherein said code includes first data based on date and time at which an instruction is given for creation of said code, and second data for identifying terminals that belong to a same category according to a predetermined rule, and said determination means includes a means for determining whether or not connection is made with said second terminal, based on said first data and said second data.

25. A second terminal in a communication system effecting communication between a first terminal and said second terminal, said first terminal storing first information for said second terminal to identify said first terminal and second information for a user of said second terminal to identify said first terminal, and transmitting said first information and said second information to said second terminal when an instruction for connection with said second terminal is detected, said second terminal including a reception means for receiving said first information and said second information from said first terminal, a determination means connected to said reception means, for determining a manner in which a user of said second terminal to recognize said second information, based on said second information, a display means for displaying said second information of said first terminal, and a control means connected to said determination means and said display means, for controlling said display means such that said second information is displayed in said determined manner.

26. A second terminal in a communication system effecting communication between a first terminal and said second terminal, said first terminal storing first information for said second terminal to identify said first terminal and second information for a user of said second terminal to identify said first terminal, transmitting said first information and said second information to said second terminal, and transmitting third information to said second terminal in response to an instruction for connection with said second terminal, said second terminal including a reception means for receiving said first information, said second information and said third information from said first terminal, a display means for displaying said second information of said first terminal, and a control means connected to said display means, for controlling said display means such that said second information is displayed in a manner for the user of said second terminal to recognize said second information more readily when said third information is received, compared to when said third information is not received.

27. The terminal according to claim 25 or 26, further comprising:

an input means for entering data for specifying a first terminal to be connected with said second terminal that is determined by the user of said second terminal based on said second information displayed at said display means; and a command transmission means connected to said input means, for transmitting a connection request command to said first terminal, based on first information of a first terminal specified by said data.

28. A second terminal in a communication system effecting communication between a first terminal and said second terminal, said first terminal transmitting information for said second terminal to identify said first terminal to said second terminal, creating a first code indicating permission for connection with said second terminal, and determining whether or not connection is to be made with said second terminal, based on a second code received from said second terminal and said first code, said second terminal including a reception means for receiving said information from said first terminal, a creation means for creating a second code indicating permission for connection with said first terminal, a command transmission means connected to said creation means, for transmitting a connection request command to said first terminal, based on said information, a code transmission means for transmitting said second code to said first terminal, based on said information, a determination means connected to said reception means, for determining a manner in which the user of said second terminal recognizes said information, a display means for displaying said information, and a control means connected to said determination means and said display means, for controlling said display means such that said information is displayed in said determined manner.

29. The terminal according to claim 28, further comprising a means for transmitting said second code to said first terminal, in response to said transmission request command received from said first terminal, said first terminal transmitting a transmission request command to said second terminal, requesting for transmission of said second code.

30. The terminal according to claim 28 or 29, wherein said code is created based on data indicating date and time at which an instruction is given for creation of said code.

31. A communication method at a first terminal in a communication system effecting communication between said first terminal and a second terminal, said second terminal receiving, from said first terminal, first information for said second terminal to identify said first terminal and second information for a user of said second terminal to identify said first terminal, determining a manner in which the user of said second terminal recognizes said second information, based on said second information, and displaying said second information in the manner, said communication method comprising the steps of:

preparing said first information and said second information;

detecting an instruction for connection with said second terminal; and transmitting said first information and said second information to said second terminal in response to said instruction.

32. A communication method at a first terminal in a communication system effecting communication between said first terminal and a second terminal, said second terminal receiving, from said first terminal, first information for said second terminal to identify said first terminal, second information for a user of said second terminal to identify said first terminal and third information, and displaying said second information in a manner for the user of said second terminal to recognize said second information more readily when said third information is received, compared to when said third information is not received, said communication method comprising the steps of preparing said first information and said second information, transmitting said first information and said second information to said second terminal, detecting an instruction for connection with said second terminal, and creating third information and transmitting said third information to said second terminal in response to said instruction.

33. A communication method at a first terminal in a communication system effecting communication between said first terminal and a second terminal, comprising the steps of:

preparing information for said second terminal to identify said first terminal;

transmitting said information to said second terminal; and creating a first code indicating permission for connection with said second terminal, said second terminal receiving said information from said first terminal, creating a second code indicating permission for connection with said first terminal, transmitting a connection request command and said second code to said first terminal based on said information, determining a manner in which the user of said second terminal recognizes said information, displaying said information by a display circuit, and controlling said display circuit such that said information is displayed in said determined manner, said communication method further comprising the steps of:

receiving said connection request command and said second code from said second terminal;

determining whether or not connection is to be made with said second terminal, based on said first code and said second code; and transmitting a connection response command to said second terminal, based on a determination result at the step of determining whether or not connection is to be made with said second terminal.

34. A communication method at a second terminal in a communication system effecting communication between a first terminal and said second terminal, said first terminal storing first information for said second terminal to identify said first terminal and second information for a user of said second terminal to identify said first terminal, and transmitting said first information and said second information to said second terminal when an instruction for connection with said second terminal is detected, said communication method comprising the steps of:

receiving said first information and said second information from said first terminal;

determining a manner in which a user of said second terminal recognizes said second information, based on said second information;

displaying said second information of said first terminal; and controlling the step of displaying said second information such that said second information is displayed in said determined manner.

35. A communication method at a second terminal in a communication system effecting communication between a first terminal and said second terminal, said first terminal storing first information for said second terminal to identify said first terminal and second information for a user of said second terminal to identify said first terminal, transmitting said first information and said second information to said second terminal, and transmitting third information to said second terminal in response to an instruction for connection with said second terminal, said communication method comprising the steps of receiving said first information, said second information and said third information, from said first terminal;

displaying said second information of said first terminal; and controlling the step of displaying said second information such that said second information is displayed in a manner for the user of said second terminal to recognize said second information more readily when said third information is received, compared to when said third information is not received.

36. A communication method at a second terminal in a communication system effecting communication between a first terminal and said second terminal, said first terminal transmitting information for said second terminal to identify said first terminal to said second terminal, creating a first code indicating permission for connection with said second terminal, and determining whether or not connection is to be made with said second terminal, based on a second code received from said second terminal and said first code, said communication method comprising the steps of:

receiving said information from said first terminal;

creating said second code indicating permission for connection with said first terminal;

transmitting a connection request command to said first terminal, based on said information;

transmitting said second code to said first terminal, based on said information;

determining a manner in which the user of said second terminal recognizes said information;

displaying said information by a display circuit; and controlling said display circuit such that said information is displayed in said determined manner.

37. A recording medium recording a program for communication using a computer, in a communication system effecting communication between a computer and a terminal, said terminal receiving, from said computer, first information for said terminal to identify said computer and second information for a user of said terminal to identify said computer, determining a manner in which the user of said terminal recognizes said second information, based on said second information, and displaying said second information in the manner, said program making said computer execute a preparation procedure for preparing said first information and said second information, a detection procedure for detecting an instruction for connection with said terminal, and a transmission procedure for transmitting said first information and said second information to said terminal, in response to said instruction.

38. A recording medium recording a program for communication using a computer, in a communication system effecting communication between a computer and a terminal, said terminal receiving, from said computer, first information for said terminal to identify said computer, second information for a user of said terminal to identify said computer and the third information, and displaying said second information in a manner for the user of said terminal to recognize said second information more readily when said third information is received, compared to when said third information is not received, said program making said computer execute a preparation procedure for preparing said first information and said second information, a transmission procedure for transmitting said first information and said second information to said terminal, a detection procedure for detecting an instruction for connection with said terminal, and an instruction transmission procedure for creating third information and transmitting said third information in response to said instruction.

39. A recording medium recording a program for communication using a computer, in a communication system effecting communication between a computer and a terminal, said program making said computer execute a preparation procedure for preparing information for said terminal to identify said computer, a transmission procedure for transmitting said information to said terminal, and a creation procedure for creating a first code indicating permission for connection with said terminal, said terminal receiving said information from said computer, creating a second code indicating permission for connection with said computer, transmitting a connection request command and said second code to said computer, based on said information, determining a manner in which the user of said second terminal recognizes said information, displaying said information by a display circuit, and controlling said display circuit such that said information is displayed in said determined manner, said program further making said computer execute a command reception procedure for receiving said connection request command and said second code from said terminal, a determination procedure for determining whether or not connection is to be made with said terminal, based on said first code and said second code, and a response command transmission procedure for transmitting a connection response command to said terminal, based on a determination result by said determination procedure.

40. The recording medium according to claim 39, wherein said program further makes said computer execute a procedure for transmitting a transmission request command to said terminal, requesting for transmission of said second code, and said terminal transmits said second code to said computer, in response to said transmission request command received from said computer.

41. The recording medium according to claim 39 or 40, wherein said code is created based on data indicating date and time at which an instruction is given for creation of said code.

42. The recording medium according to claim 39 or 40, wherein said code includes first data based on date and time at which an instruction is given for creation of said code, and second data for identifying terminals that belong to a same category according to a predetermined rule, and said determination procedure includes a procedure for determining whether or not connection is to be made with said terminal, based on said first data and said second data.

43. A recording medium recording a program for communication using a computer, in a communication system effecting communication between a terminal and said computer, said terminal storing first information for said computer to identify said terminal and second information for a user of said computer to identify said terminal, and transmitting said first information and said second information to said computer when an instruction for connection with said computer is detected, said program making said computer execute a reception procedure for receiving said first information and said second information from said terminal, a determination procedure for determining a manner in which a user of said computer recognizes said second information, based on said second information, a display procedure for displaying said second information of said terminal, and a control procedure for controlling said display procedure such that said second information is displayed in said determined manner.

44. A recording medium recording a program for communication using a computer, in a communication system effecting communication between a terminal and said computer, said terminal storing first information for said computer to identify said terminal and second information for a user of said computer to identify said terminal, transmitting said first information and said second information to said computer, and transmitting third information to said computer in response to an instruction for connection with said computer, said program making said computer execute a reception procedure for receiving said first information, said second information and said third information from said terminal, a display procedure for displaying said second information of said terminal, and a control procedure for controlling said display procedure such that said second information is displayed in a manner for the user of said computer to recognize said second information more readily when said third information is received, compared to when said third information is not received.

45. The recording medium according to claim 43 or 44, wherein said program further makes said computer execute an input procedure for entering data for specifying a terminal to be connected with said computer, determined by the user of said computer based on said second information displayed at said display procedure, and a command transmission procedure for transmitting a connection request command to said terminal, based on first information of a terminal specified by said data.

46. A recording medium recording a program for communication using a computer, in a communication system effecting communication between a terminal and said computer, said terminal transmitting information for said computer to identify said terminal to said computer, creating a first code indicating permission for connection with said computer, and determining whether or not connection is to be made with said computer, based on a second code received from said computer and said first code, said program making said computer execute a reception procedure for receiving said information from said terminal, a creation procedure for creating a second code indicating permission for connection with said terminal, a command transmission procedure for transmitting a connection request command to said terminal, based on said information, a code transmission procedure for transmitting said second code to said terminal, based on said information, a determination procedure for determining a manner in which the user of said second terminal recognizes said information, a display procedure for displaying said information, and a control procedure for controlling the display of said information in said determined manner.

47. The recording medium according to claim 46, wherein said terminal transmits a transmission request command requesting for transmission of said second code to said computer, and said program further makes said computer execute a procedure for transmitting said second code to said terminal, in response to said transmission request command received from said terminal.

48. The recording medium according to claim 46 or 47, wherein said code is created based on data indicating date and time at which an instruction is given for creation of said code.

* * * * *

UNITED STATES PATENT AND TRADEMARK OFFICE
CERTIFICATE OF CORRECTION

PATENT NO. : 6,978,148 B2 Page 1 of 1
APPLICATION NO. : 10/191501
DATED : December 20, 2005
INVENTOR(S) : Makoto Adachi et al.

It is certified that error appears in the above-identified patent and that said Letters Patent is hereby corrected as shown below:

Title Page

(56)           References Cited

U.S. PATENT DOCUMENTS

Please add:     6,188,909 B1    02/2011    Alanara et al. ..........455/466

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,978,148 B2 | Page 1 of 1 |
| APPLICATION NO. | : 10/191501 | |
| DATED | : December 20, 2005 | |
| INVENTOR(S) | : Makoto Adachi et al. | |

It is certified that error appears in the above-identified patent and that said Letters Patent is hereby corrected as shown below:

Title Page

(56)     References Cited

U.S. PATENT DOCUMENTS

Please add:     6,188,909 B1     02/2001     Alanara et al. ..........455/466

This certificate supersedes Certificate of Correction issued August 1, 2006.

Signed and Sealed this

Twenty-eighth Day of August, 2007

JON W. DUDAS
*Director of the United States Patent and Trademark Office*